(12) United States Patent
Nakai et al.

(10) Patent No.: US 7,853,387 B2
(45) Date of Patent: Dec. 14, 2010

(54) CONTROLLER FOR OPERATION OF VEHICLE AND CONTROL METHOD FOR THE SAME

(75) Inventors: Yasuhiro Nakai, Anjo (JP); Kenji Kawahara, Kariya (JP); Shoji Inagaki, Numazu (JP); Hideki Takamatsu, Anjo (JP)

(73) Assignees: Denso Corporation, Kariya, Aichi-Pref. (JP); Toyota Jidosha Kabushiki Kaisha, Toyota, Aichi-Pref. (JP)

( * ) Notice: Subject to any disclaimer, the term of this patent is extended or adjusted under 35 U.S.C. 154(b) by 1035 days.

(21) Appl. No.: 11/629,291

(22) PCT Filed: Mar. 30, 2006

(86) PCT No.: PCT/JP2006/007295

§ 371 (c)(1),
(2), (4) Date: Dec. 13, 2006

(87) PCT Pub. No.: WO2006/109658

PCT Pub. Date: Oct. 19, 2006

(65) Prior Publication Data

US 2008/0051962 A1    Feb. 28, 2008

(30) Foreign Application Priority Data

Apr. 6, 2005  (JP) .............................. 2005-109340

(51) Int. Cl.
*G06F 19/00* (2006.01)
*G06F 7/70* (2006.01)
*G06G 7/00* (2006.01)
*G06G 7/76* (2006.01)

(52) U.S. Cl. ................ 701/70; 701/1; 701/78; 701/83; 702/56; 318/432

(58) Field of Classification Search ................ 701/70, 701/78; 702/56; 180/197; 318/432
See application file for complete search history.

(56) References Cited

U.S. PATENT DOCUMENTS 5,101,786 A * 4/1992 Kamio et al. ............... 123/399
6,314,342 B1   11/2001 Kramer et al.

(Continued)

FOREIGN PATENT DOCUMENTS

WO    WO 2004/045898 A2    6/2004

OTHER PUBLICATIONS

International Search Report for PCT/JP2006/307295 mailed Aug. 4, 2006.

*Primary Examiner*—Khoi Tran
*Assistant Examiner*—Jaime Figueroa
(74) *Attorney, Agent, or Firm*—Nixon & Vanderhye PC

(57) ABSTRACT

A controller controls braking force and driving force of a vehicle, in accordance with demand force. The controller includes a first and second demand force arithmetic units for arithmetically calculating first and second demand force. The first demand force includes a factor inducing vibration in suspended components of the vehicle. The second demand force substantially excludes the factor inducing vibration in suspended components of the vehicle. A vibration damping filter reduces the factor from a waveform of the first demand force, thereby producing post-filter demand force. An arbitration unit compares the post-filter demand force with the second demand force, thereby selecting one of the post-filter demand force and second demand force as final demand force.

16 Claims, 14 Drawing Sheets

U.S. PATENT DOCUMENTS

| | | | |
|---|---|---|---|
| 7,212,896 B2* | 5/2007 | Coelingh et al. | 701/48 |
| 7,412,317 B2* | 8/2008 | Takamatsu et al. | 701/70 |
| 7,580,786 B2* | 8/2009 | Yanakiev | 701/97 |
| 7,590,481 B2* | 9/2009 | Lu et al. | 701/70 |
| 2001/0044685 A1* | 11/2001 | Schubert | 701/50 |
| 2003/0225495 A1* | 12/2003 | Coelingh et al. | 701/48 |
| 2004/0034460 A1* | 2/2004 | Folkerts et al. | 701/54 |
| 2005/0049761 A1* | 3/2005 | Kataoka et al. | 701/1 |
| 2005/0060080 A1* | 3/2005 | Phillips et al. | 701/54 |
| 2006/0278197 A1* | 12/2006 | Takamatsu et al. | 123/396 |
| 2007/0067085 A1* | 3/2007 | Lu et al. | 701/70 |

* cited by examiner

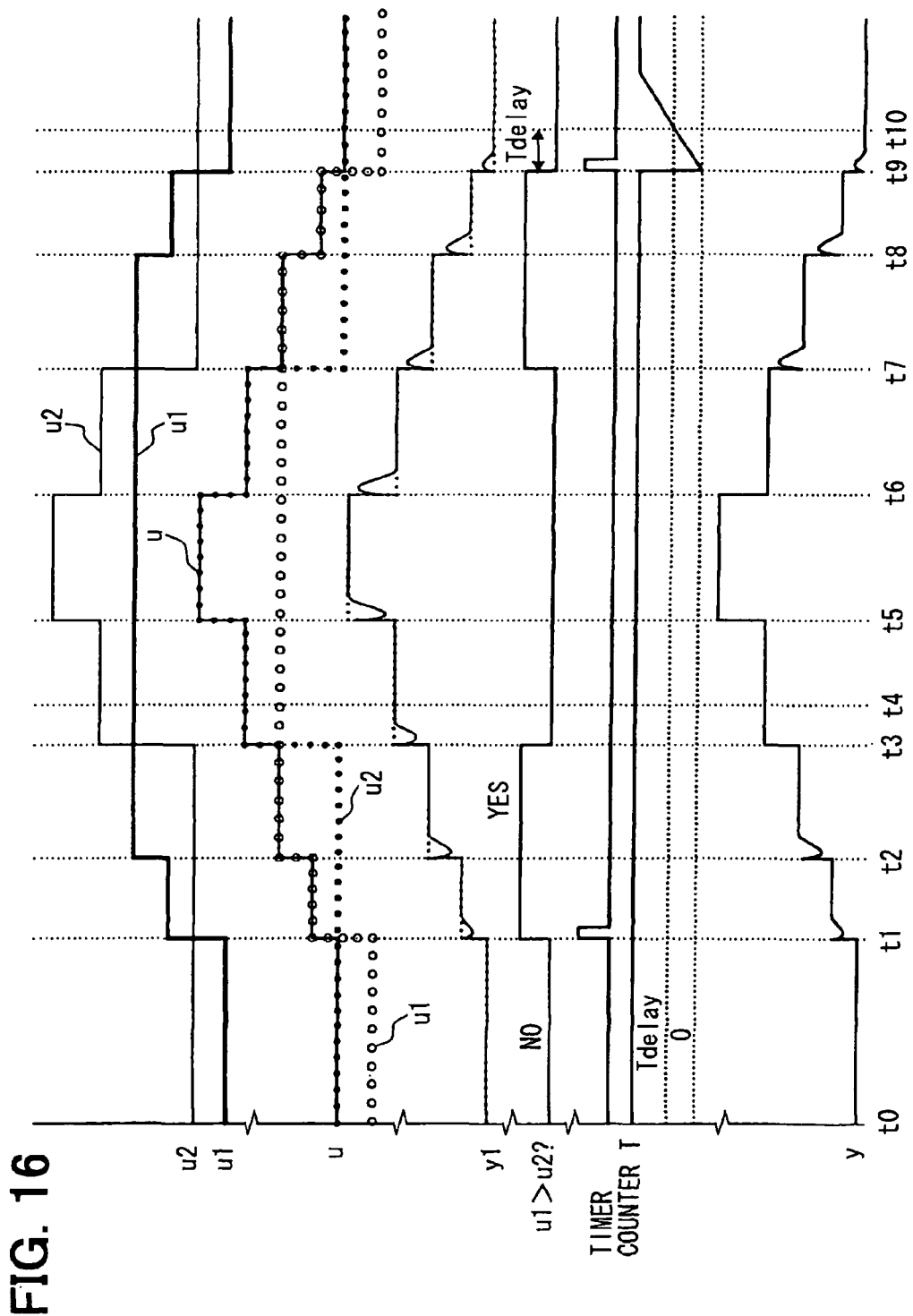

US 7,853,387 B2

CONTROLLER FOR OPERATION OF VEHICLE AND CONTROL METHOD FOR THE SAME

CROSS REFERENCE TO RELATED APPLICATIONS

This application is the US national phase of International application PCT/JP2006/307295, filed 30 Mar. 2006, which designated the U.S. and claims priority of JP 2005-109340 filed 6 Apr. 2005, the entire contents of each of which are hereby incorporated by reference.

TECHNICAL FIELD

The present invention relates to a controller and a method for controlling driving force and braking force of a vehicle.

BACKGROUND ART

JP-A-2004-168148 discloses an optimized control operation for restricting vibration of the vehicle. In this structure, the braking force generated in the engine and driving force generated in the brake device are corrected so as to restrict vibration from arising in the vehicle body. The braking force and driving force are corrected using a kinetic model, which is a dynamics model of vibration of the vehicle. This vibration of the vehicle includes vibration of a tire of the vehicle, vibration arising in unsuspended components under a suspension of the vehicle, and vibration applied to the vehicle body, which is a suspended component, for example. This vibration may be caused due to operations such as an accelerating operation, steering operation, and brake operation.

The driver performs manual driving operations such as the accelerating operation, steering operation, and brake operation. Consequently, demand braking driving force (demand force) is changed in the vehicle operation. In addition, the demand force is influenced by various kinds of automatic running controls such as a cruise control, which is a constant speed control, precrush brake control, which is a collision preventing brake control, traction control, vehicle dynamic control (VDC), and the like. Accordingly, the demand braking driving force (driver demand force) according to the manual driving operation of the driver and the demand braking driving force (cruise demand force) for executing the automatic running control such as the cruise control, are arbitrated in the vehicle operation. Specifically, one of the demand force is determined as final demand force, so that the braking driving force is controlled.

In this structure, the demand force after the arbitration is one of the driver demand force and cruise demand force. Therefore, when the final demand force is calculated by performing vibration damping processing with respect to the demand force after the arbitration, the vibration damping processing may be also performed with respect to both the cruise demand force and the cruise control.

However, dynamic characteristics of the vehicle are influenced by the vibration damping processing. Therefore, the system such as the cruise control needs to be designed in conformity with the vibration damping processing. Accordingly, when the vehicle controller is constructed so as to perform the cruise control, and the like, by performing the vibration damping processing with respect to the cruise demand force, the system construction may become complicated. Furthermore, it is necessary to secure an excessive robust property so as to obtain a predetermined desirable vibration damping effect in all control ranges when vibration damping control characteristics are variably set in accordance with operating states of the vehicle, and the like.

DISCLOSURE OF THE INVENTION

In view of the foregoing and other problems, it is an object of the present invention to produce a controller for a vehicle, the controller having a simplified vibration damping control system and a robust property for arbitrating demand force. It is another object to produce a method for controlling the vehicle.

According to one aspect of the present invention, a controller controls braking force and driving force of a vehicle in accordance with demand force. The controller includes a first demand force arithmetic unit, a second demand force arithmetic unit, a vibration damping filter, and an arbitration unit. The first demand force arithmetic unit is adapted to arithmetically calculating first demand force, which includes a factor inducing vibration in suspended components of the vehicle. The second demand force arithmetic unit is adapted to arithmetically calculating second demand force, which substantially excludes a factor inducing vibration in suspended components of the vehicle. The vibration damping filter is adapted to reducing the factor inducing vibration in suspended components of the vehicle from a waveform of the first demand force, thereby producing post-filter demand force. The arbitration unit is adapted to comparing the post-filter demand force, which is filtered using the vibration damping filter, with the second demand force, thereby selecting one of the post-filter demand force and second demand force as final demand force.

Alternatively, a controller controls braking force and driving force of a vehicle in accordance with demand force. The controller includes a first demand force arithmetic unit, a second demand force arithmetic unit, a first arbitration unit, a vibration damping filter, and a second arbitration unit. The first demand force arithmetic unit is adapted to arithmetically calculating first demand force, which includes a factor inducing vibration in suspended components of the vehicle. The second demand force arithmetic unit is adapted to arithmetically calculating second demand force, which substantially excludes a factor inducing vibration in suspended components of the vehicle. The first arbitration unit is adapted to comparing the first demand force with the second demand force, thereby selecting one of the first demand force and second demand force. The vibration damping filter is adapted to reducing the factor inducing vibration in suspended components of the vehicle from a waveform of the one of the first demand force and second demand force selected using the first arbitration unit, thereby producing post-filter demand force. The second arbitration unit is adapted to comparing the post-filter demand force, which is filtered using the vibration damping filter, with the one of the first demand force and second demand force selected using the first arbitration unit, thereby selecting one of the post-filter demand force and the one of the first demand force and second demand force as final demand force.

A method, which is for controlling braking force and driving force of a vehicle in accordance with demand force, includes the following steps.

First demand force is firstly calculated. The first demand force includes a factor inducing vibration in suspended components of the vehicle. Second demand force is secondly calculated. The second demand force substantially excludes a factor inducing vibration in suspended components of the vehicle. The factor inducing vibration in suspended components of the vehicle is reduced from a waveform of the first demand force, so that post-filter demand force is produced. The post-filter demand force is compared with the second demand force, so that one of the post-filter demand force and second demand force is selected as final demand force.

Alternatively, a method, which is for controlling braking force and driving force of a vehicle in accordance with demand force, includes the following steps. First demand force, which includes a factor inducing vibration in suspended components of the vehicle, is firstly calculated. Second demand force, which substantially excludes a factor inducing vibration in suspended components of the vehicle, is secondly calculated. The first demand force is firstly compared with the second demand force, so that one of the first demand force and second demand force is selected. The factor inducing vibration in suspended components of the vehicle is reduced from a waveform of the one of the first demand force and second demand force, so that post-filter demand force is produced. The post-filter demand force is secondly compared with the one of the first demand force and second demand force, so that one of the post-filter demand force and the one of the first demand force and second demand force is selected as final demand force.

According to the above structures and methods, the controller having a simple system is capable of producing a robust property for arbitrating demand force.

BRIEF DESCRIPTION OF THE DRAWINGS

FIG. 16 is a time chart showing an example of an arbitration of the demand force, according to the fifth embodiment;

BEST MODES FOR CARRYING OUT THE INVENTION

First Embodiment

Figure 1:
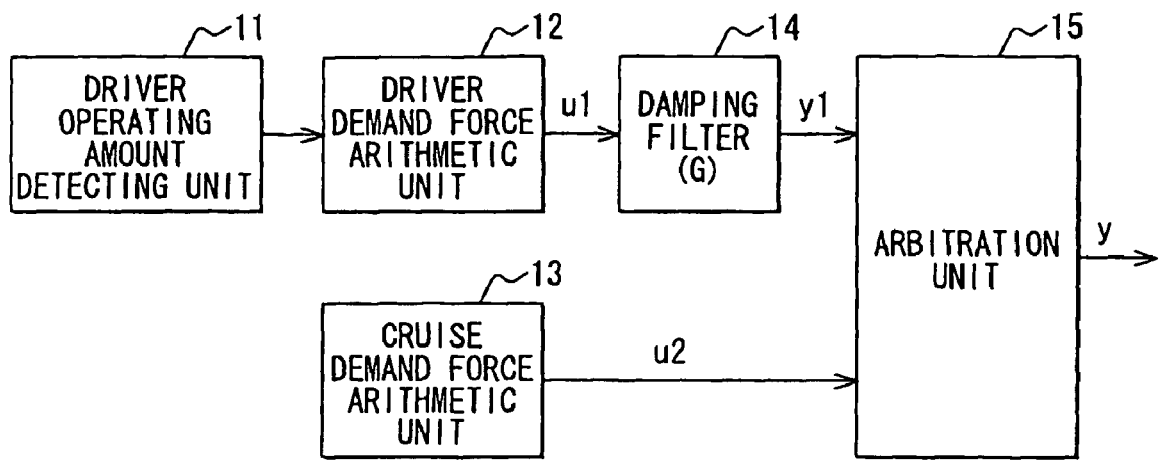
FIG. 1 is a block diagram showing a vehicular control system, according to a first embodiment of the present invention.

The construction of a vehicle braking driving force control system is described in reference to FIG. 1.

A driver operating amount detecting unit 11 is constructed of a sensor for detecting a driver operating amount, such as an accelerator position, brake position, and steering angle. More specifically, the driver operating amount includes a stepping-in amount of an accelerator pedal, stepping-in amount of a brake pedal, and steering angle of a steering wheel. A throttle position may be detected instead of the accelerator position. In addition, the oil pressure of a brake master cylinder may be also detected instead of the brake position.

A driver demand braking driving force arithmetic unit (a first demand force arithmetic unit) 12 arithmetically calculates driver demand braking driving force u1 on the basis of the driver operating amount detected using the driver operating amount detecting unit 11. This driver demand braking driving force is demand driving force and demand braking force, which are demanded by the driver. This driver demand braking driving force (driver demand force) u1 corresponds to first demand force, which includes a factor inducing vibration in suspended components of the vehicle. The suspended components are spring components on a suspension of the vehicle, for example.

A cruise demand braking driving force arithmetic unit (a second demand force arithmetic unit) 13 arithmetically calculates cruise demand braking driving force (cruise demand force) u2 so as to remove the deviation between a target vehicle speed, which is set by a driver in a cruise control for constantly controlling running speed of the vehicle, and the present vehicle speed. This cruise demand force u2 corresponds to second demand force, which excludes a factor inducing vibration in suspended components of the vehicle.

In addition, various demand braking driving force (demand force) for executing automatic running controls is arithmetically calculated in a vehicle having various kinds of automatic running control systems. The automatic running control systems may include precrush brake control (collision preventing brake control), traction control, vehicle dynamic control (VDC), and the like. The demand braking driving force for executing automatic running controls also corresponds to the second demand force non-inducing suspended vibration, similarly to the cruise demand force u2.

A vibration damping filter 14 is a filter for filtering only the driver demand force u1 arithmetically calculated using the driver demand force arithmetic unit 12, in this embodiment. In addition, the vibration damping filter 14 is for removing a factor of a predetermined frequency band inducing vibration in suspended components of the vehicle from a waveform of this driver demand force u1. The vibration damping filter 14 is constructed of a band elimination filter (band rejection filter), and the like.

An arbitration unit 15 performs a processing of arbitration, i.e., mediation for comparing post-filter driver demand force y1 filtered using the vibration damping filter 14, and the cruise demand force u2 arithmetically calculated using the cruise demand force arithmetic unit 13. Thus, the arbitration unit 15 selects the greater one of the post-filter driver demand force y1 and the cruise demand force u2, as final demand braking driving force (final demand force) y. The engine driving force, which is generated using the engine, and the braking force, which is generated using a brake device, are controlled by operating a fuel injection amount, an ignition period, an intake air amount substantially corresponding to the throttle position, and the like, on the basis of the final demand force y selected using this arbitration unit 15.

In this first embodiment, the vibration damping filter 14 is applied only to the driver demand force u1, which includes the factor inducing vibration in suspended components of the vehicle, so that the arbitration is performed with respect to the post-filter driver demand force y1 filtered using the vibration damping filter 14 and the cruise demand force u2. Specifically, the post-filter driver demand force y1 is compared with the cruise demand force u2, which is not filtered using the vibration damping filter 14, so that the greater one is selected as the final demand force y. The arbitration of this demand force is executed as follows by the demand force arithmetic routine in FIG. 2 during an engine operation.

Figure 2:
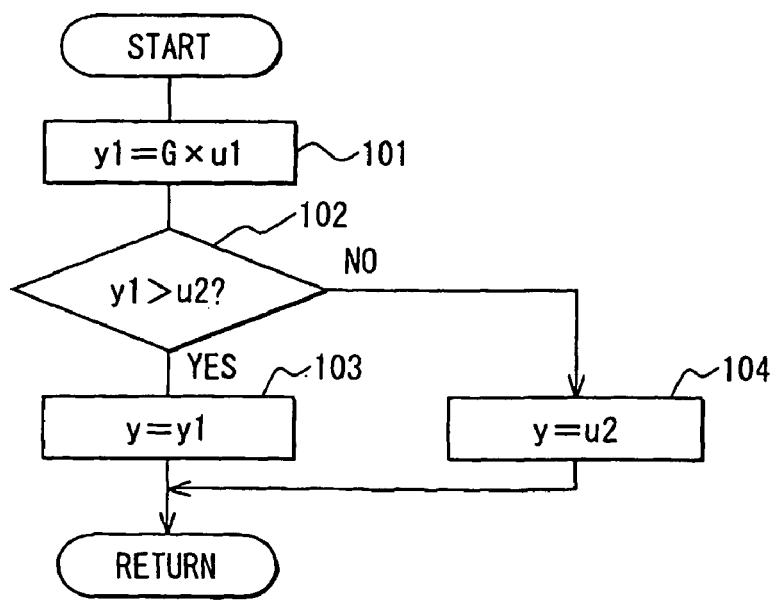
FIG. 2 is a flowchart showing a routine for calculating a demand force, according to the first embodiment.

The demand force arithmetic routine in FIG. 2 is executed at predetermined intervals during the engine operation. In step 101, the vibration damping filter 14 having a filter characteristic G is applied only to the driver demand force u1 including a factor inducing vibration in suspended components of the vehicle. Thus, the post-filter driver demand force y1 is calculated, such that a factor of a predetermined frequency band inducing vibration in suspended components of the vehicle is removed from the waveform of the driver demand force u1.

Thereafter, the routine proceeds to step 102, in which the post-filter driver demand force y1 filtered using the vibration damping filter 14 is compared with the cruise demand force u2, which is not filtered using the vibration damping filter 14. When the post-filter driver demand force y1 is greater than the cruise demand force u2, the routine proceeds to step 103, in which the post-filter driver demand force y1 is selected as the final demand force y. By contrast, when the post-filter driver demand force y1 is equal to or less than the cruise demand force u2, the routine proceeds to step 104 and the cruise demand force u2, which is not filtered using the vibration damping filter 14, is selected as the final demand force y.

Figure 3:
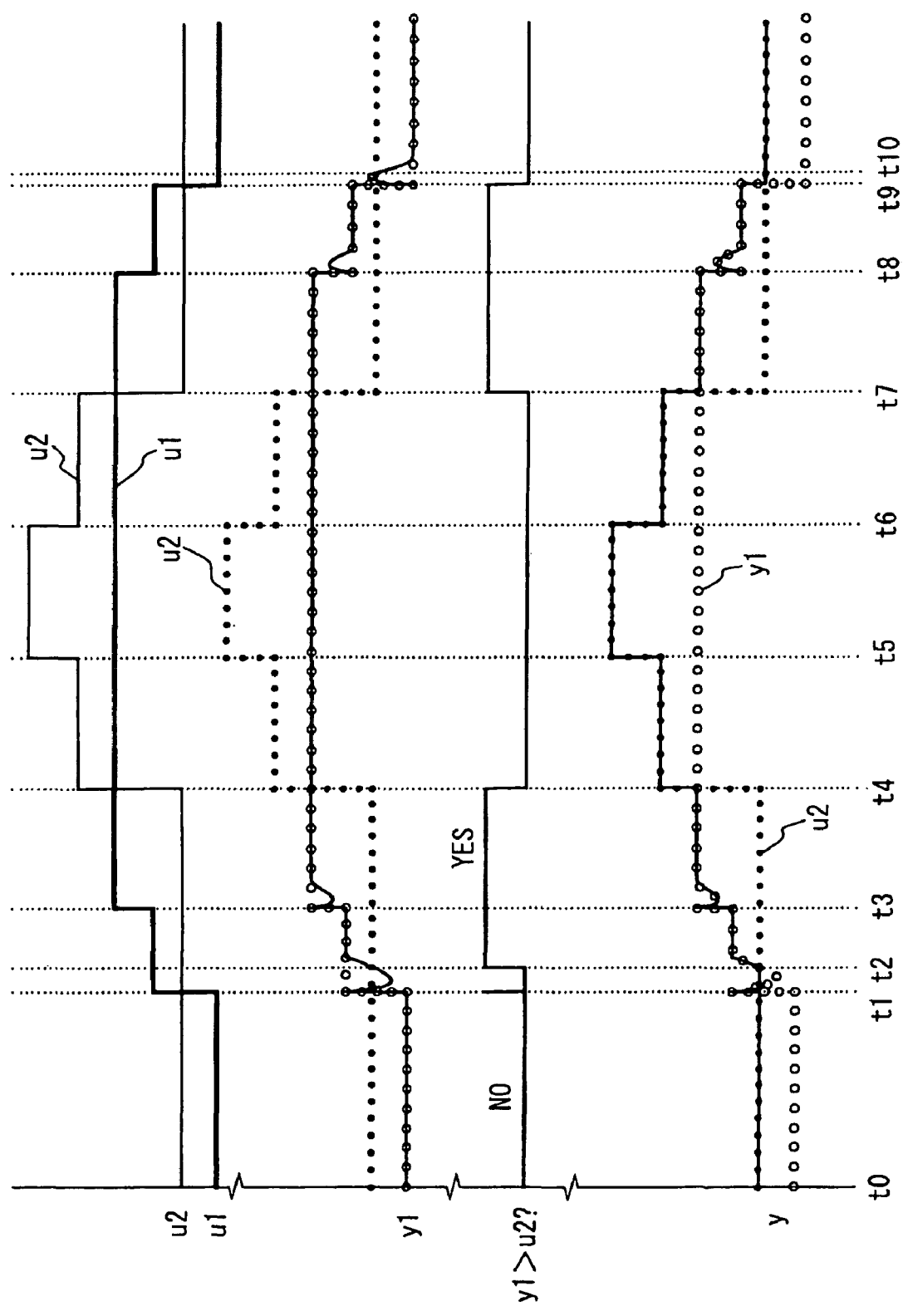
FIG. 3 is a time chart showing an example of an arbitration of the demand force, according to the first embodiment.

As follows, one example of the arbitration of the demand force of this first embodiment is described in reference to the time chart shown in FIG. 3.

The cruise demand force u2 is greater than the post-filter driver demand force y1 in the period between t0 and t1. Therefore, the cruise demand force u2 is selected as the final demand force y in the period between t0 and t1. The post-filter driver demand force y1 instantaneously becomes greater than the cruise demand force u2 at the timing t1. Therefore, the post-filter driver demand force y1 is instantaneously selected as the final demand force y at the timing t1. However, immediately after this selection, the post-filter driver demand force y1 returns to be equal to or less than the cruise demand force u2 by the characteristics of the vibration damping filter 14. Therefore, it is returned to the state in which the cruise demand force u2 is selected as the final demand force y.

Subsequent to the timing t2, the post-filter driver demand force y1 becomes greater than the cruise demand force u2, so that the post-filter driver demand force y1 is selected as the final demand force y. Thereafter, subsequent to the timing t4, the cruise demand force u2 becomes greater than the post-filter driver demand force y1, so that the post-filter driver demand force y1 is selected as the final demand force y.

Subsequent to the timing t7, the cruise demand force u2 becomes equal to or less than the post-filter driver demand force y1, so that the post-filter driver demand force y1 is selected as the final demand force y. Subsequent to the timing t9, the post-filter driver demand force y1 becomes equal to or less than the cruise demand force u2, so that the cruise demand force u2 is selected as the final demand force y.

COMPARATIVE EXAMPLE

Figure 4:
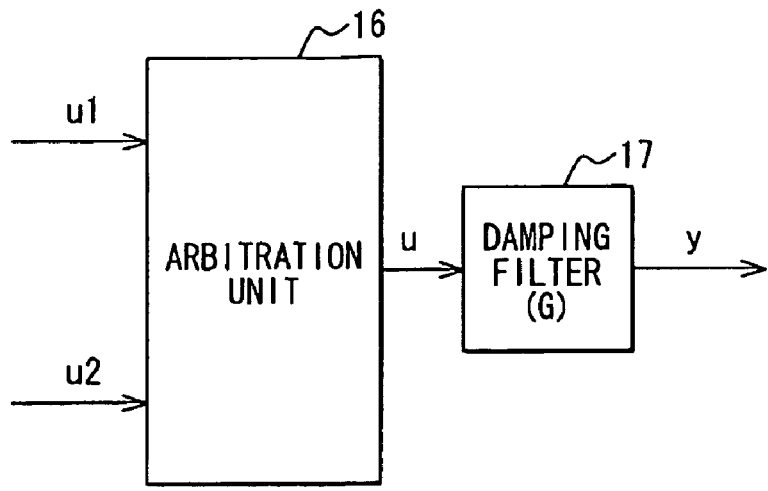
FIG. 4 is a block diagram showing a vehicular control system, according to a comparison example.
Figure 5:
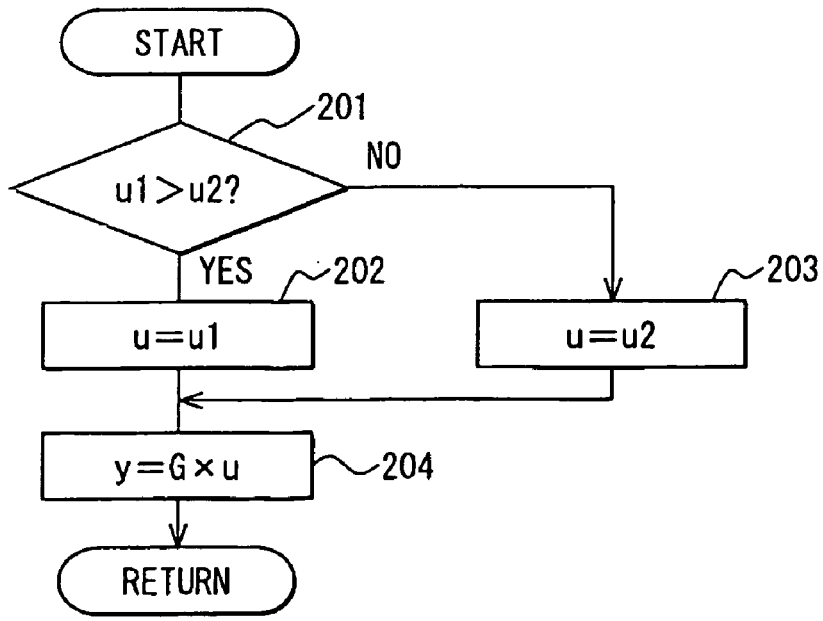
FIG. 5 is a flowchart showing a routine for calculating a demand force, according to the comparison example.
Figure 6:
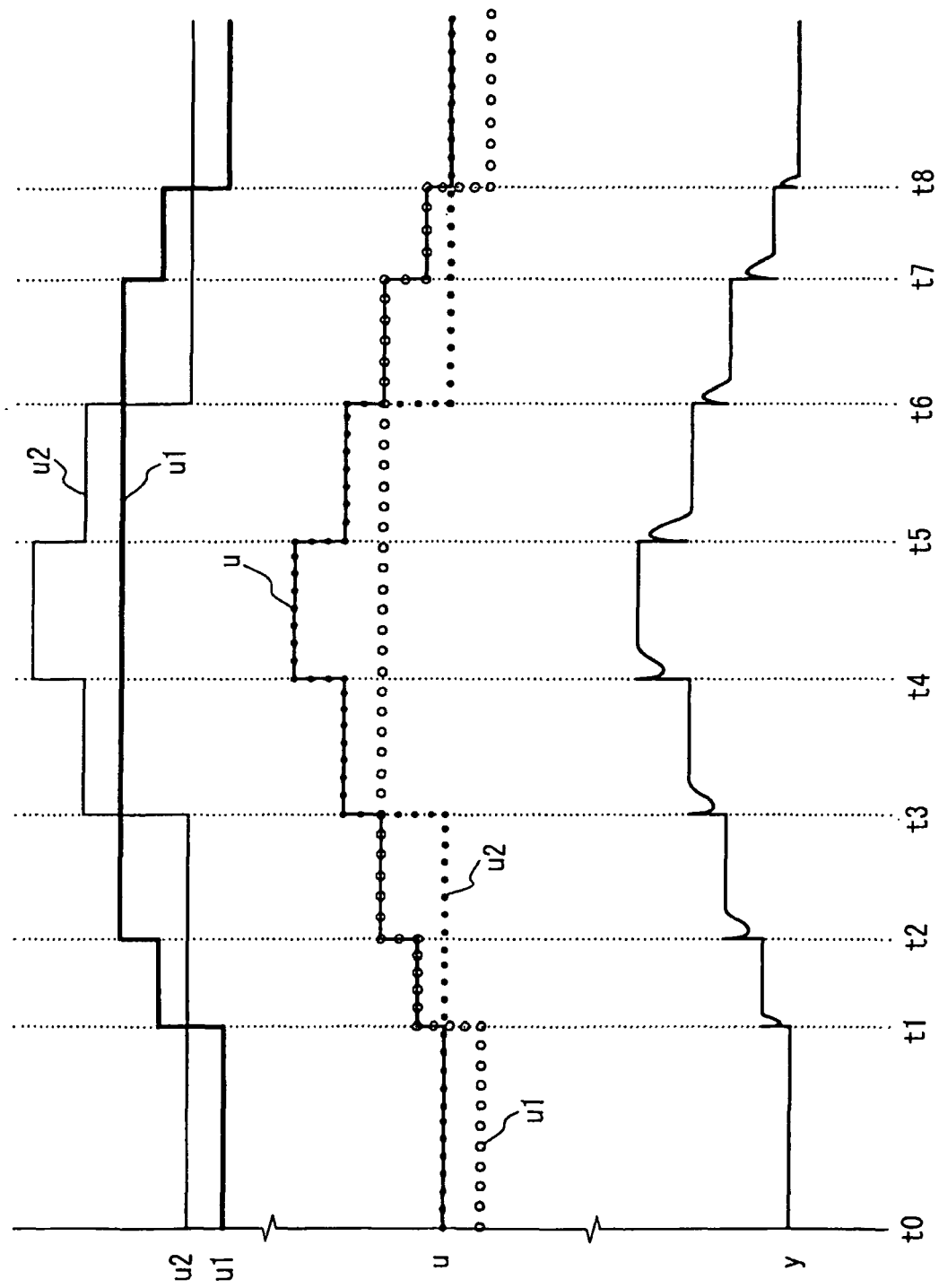
FIG. 6 is a time chart showing an example of an arbitration of the demand force, according to the comparison example.

Next, a comparison example is described in reference to FIGS. 4 to 6. In the above first embodiment, the vibration damping filter 14 is applied only to the driver demand force u1 including a factor inducing vibration in suspended components of the vehicle. The post-filter driver demand force y1 filtered using this vibration damping filter 14 is compared with the cruise demand force u2 not filtered using the vibration damping filter 14, so that the greater one is selected as the final demand force y. However, in the comparison example, as shown in FIG. 5, the driver demand force u1 is compared with the cruise demand force u2 using an arbitration unit 16 in step 201, so that the greater one is selected in steps 202, 203. In the subsequent step 204, the demand force u selected using this arbitration unit 16 is filtered using a vibration damping filter 17 having a filter characteristic G, so that the final demand force y is calculated.

As follows, one example of the arbitration of the demand force of the comparison example is described in reference to the time chart shown in FIG. 6.

In this comparison example, the driver demand force u1 is compared with the cruise demand force u2 using the arbitration unit 16, so that the greater one is selected. The selected demand force u is filtered using the vibration damping filter 17, so that the final demand force y is calculated. Accordingly, the effect of the vibration damping filter 17 is produced in the period between t1 and t8, in which one of the driver demand force u1 and the cruise demand force u2 changes. Therefore, the effect of the vibration damping filter 17 is also produced in the period between t3 and t6 for changing the cruise demand force u2.

As follows, a comparison between the first embodiment and the comparative example is described.

In the comparison example, the demand force u after performing the arbitration using the arbitration unit 16 is one of the driver demand force u1 and the cruise demand force u2. Therefore, in this structure, in which the final demand force y is calculated by filtering the demand force u using the vibration damping filter 17 after performing the arbitration, the vibration damping filter 17 may also be used with respect to the cruise demand force u2 in the cruise control.

However, since dynamic characteristics of the vehicle are influenced using the vibration damping filter 17, it is necessary to design the system of the cruise control in conformity with the vibration damping filter 17. Accordingly, when it is constructed so as to perform the cruise control by using the vibration damping filter 17 with respect to the cruise demand force u2, the system construction may become complicated. Furthermore, when the characteristics of the vibration damping filter 17 are variably set in accordance with operating states of the vehicle, and the like, it is necessary to secure an excessive robust property so as to produce a predetermined desirable vibration damping effect in all the filter characteristics.

By contrast, in the first embodiment, the vibration damping filter 14 is applied only to the driver demand force u1 including a factor inducing vibration in suspended components of the vehicle. The post-filter driver demand force y1 filtered using this vibration damping filter 14 is compared with the cruise demand force u2 not filtered using the vibration damping filter 14, so that the greater one is selected as the final demand force y. Therefore, it is not necessary to apply the vibration damping filter 14 to the cruise demand force u2 excluding a factor inducing vibration in suspended components of the vehicle. As a result, design of the vibration damping filter 14 can be facilitated, and the system design of the vibration damping control can be simplified while securing the robust property.

Summarizing this first embodiment, the controller is adapted to controlling the braking force and driving force of the vehicle, in accordance with the demand force. The controller includes the first demand force arithmetic unit 12, second demand force arithmetic unit 13, vibration damping filter 14, and arbitration unit 15. The first demand force arithmetic unit 12 is adapted to arithmetically calculating the first demand force u1, which includes the factor inducing vibration in suspended components of the vehicle. The second demand force arithmetic unit 13 is adapted to arithmetically calculating the second demand force u2, which substantially excludes the factor inducing vibration in suspended components of the vehicle. The vibration damping filter 14 is adapted to reducing the factor inducing vibration in suspended components of the vehicle from the waveform of the first demand force u1, thereby producing the post-filter demand force y1. The arbitration unit 15 is adapted to comparing the post-filter demand force y1, which is filtered using the vibration damping filter 14, with the second demand force u2, thereby selecting one of the post-filter demand force y1 and second demand force u2 as the final demand force y.

Second Embodiment

Figure 7:
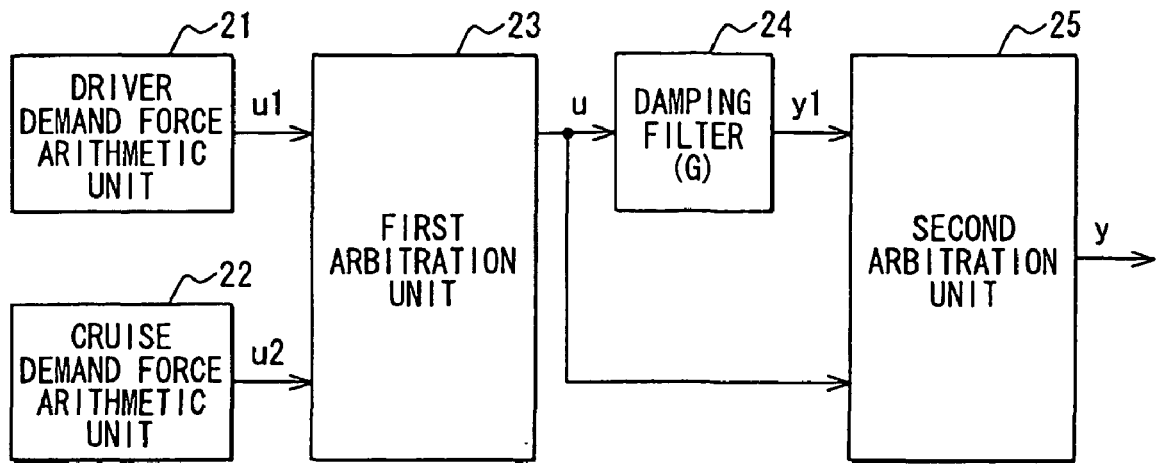
FIG. 7 is a block diagram showing a vehicular control system, according to a second embodiment of the present invention.
Figure 8:
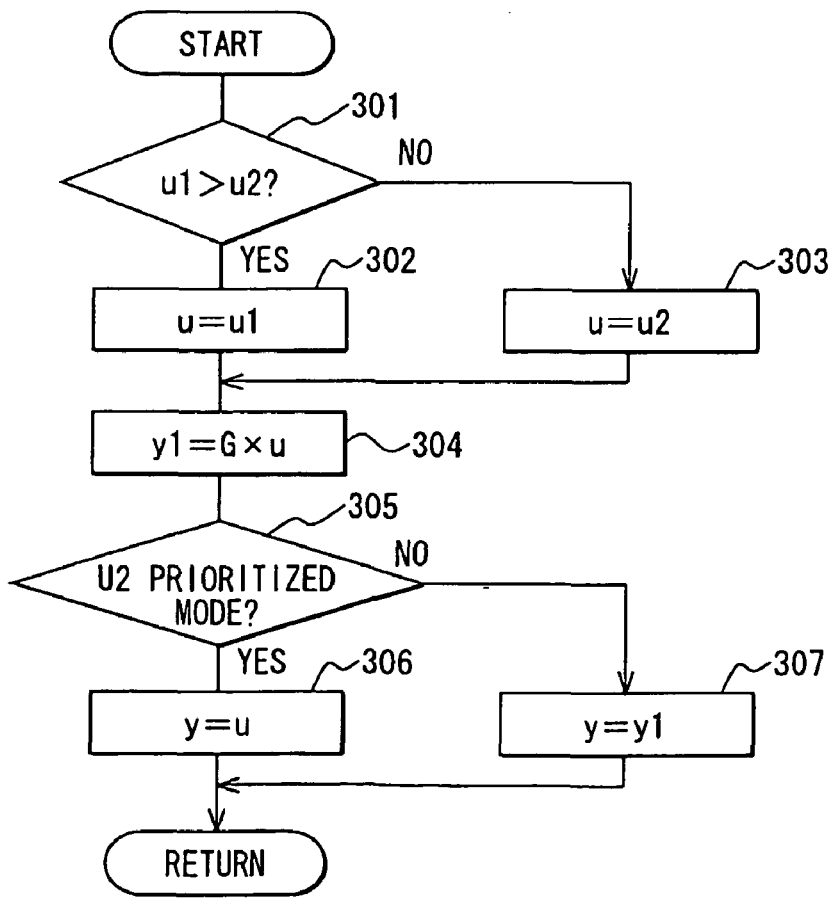
FIG. 8 is a flowchart showing a routine for calculating a demand force, according to the second embodiment.
Figure 9:
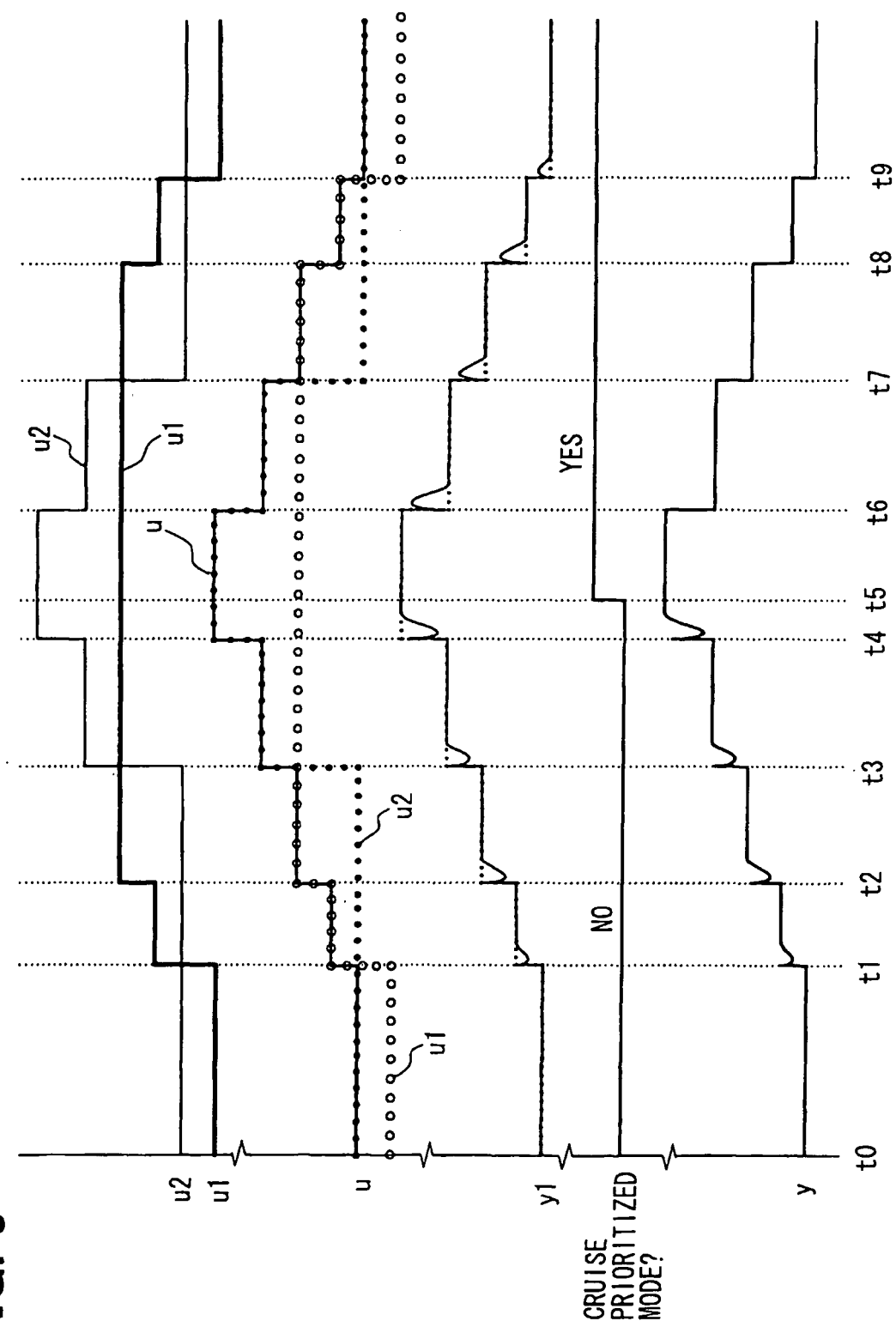
FIG. 9 is a time chart showing an example of an arbitration of the demand force, according to the second embodiment.

In the second embodiment of the present invention shown in FIGS. 7 to 9, a vehicle controller is constructed of a driver demand force arithmetic unit (first demand force arithmetic unit) 21, a cruise demand force arithmetic unit (second demand force arithmetic unit) 22, a first arbitration unit 23, a vibration damping filter 24, and a second arbitration unit 25. The driver demand force arithmetic unit 21 arithmetically calculates the driver demand force u1 (first demand force) including a factor inducing vibration in suspended components of the vehicle. The cruise demand force arithmetic unit 22 arithmetically calculates the cruise demand force u2 (second demand force) excluding a factor inducing vibration in suspended components of the vehicle. The first arbitration unit 23 compares the driver demand force u1 and the cruise demand force u2, thereby selecting one of these demand force u1, u2, as temporary demand force u. The vibration damping filter 24 removes a factor inducing vibration in suspended components of the vehicle from a waveform of the temporary demand force u selected using this first arbitration unit 23, so that the vibration damping filter 24 calculated post-filter temporary demand force y1. The second arbitration unit 25 compares the post-filter temporary demand force y1 filtered using this vibration damping filter 24 with the temporary demand force u selected using the first arbitration unit 23, thereby selecting one of these demand force as the final demand force y.

In this second embodiment, the vehicle controller has a function such that a driver is capable of setting an operating mode at one of a normal vibration damping mode and a cruise prioritized mode. The cruise demand force u2 is preferentially selected in the cruise prioritized mode. When the operating mode is set at the normal vibration damping mode, the second arbitration unit 25 selects the post-filter temporary demand force y1 produced by filtering the temporary demand force u using the vibration damping filter 24, as the final demand force y. The temporary demand force u is selected using the first arbitration unit 23. When the operating mode is set at the cruise prioritized mode, the second arbitration unit 25 selects the temporary demand force u selected using the first arbitration unit 23 as the final demand force y as it is.

In this second embodiment, the final demand force y is arithmetically calculated, as follows, by executing the demand force arithmetic routine shown in FIG. 8 at a predetermined interval during the engine operation. First, in step 301, the driver demand force u1 arithmetically calculated using the driver demand force arithmetic unit 21 is compared with the cruise demand force u2 arithmetically calculated using the cruise demand force arithmetic unit 22. When the driver demand force u1 is greater than the cruise demand force u2, the routine proceeds to step 302, in which the driver demand force u1 is selected as the temporary demand force u. By contrast, when the driver demand force u1 is equal to or less than the cruise demand force u2, the routine proceeds to step 303, in which the cruise demand force u2 is selected as the temporary demand force u.

Thereafter, the routine proceeds to step 304, in which the temporary demand force u is filtered using the vibration damping filter 24 having the filter characteristic G, so that the post-filter temporary demand force y1 is calculated. Thereafter, the routine proceeds to step 305, in which it is evaluated whether the operating mode is set at the cruise prioritized mode (u2 prioritized mode). When the operating mode is set at the cruise prioritized mode, the routine proceeds to step 306, in which the temporary demand force u is selected as the final demand force y as it is. By contrast, when the operating mode is set at the normal vibration damping mode, the routine proceeds to step 307, in which the post-filter temporary demand force y1 produced by filtering the temporary demand force u using the vibration damping filter 24 is selected as the final demand force y.

As follows, one example of the arbitration of the demand force of this second embodiment is described in reference to the time chart shown in FIG. 9.

In the example of FIG. 9, the operating mode is switched from the normal vibration damping mode to the cruise prioritized mode at the timing t5. Since the operating mode is set at the normal vibration damping mode in the period between t0 and t5, the post-filter temporary demand force y1 is selected as the final demand force y. Accordingly, in the period between t0 and t5, the post-filter temporary demand force y1 calculated by filtering this temporary demand force u using the vibration damping filter 24 becomes the final demand force y, in either case, in which one of the driver demand force u1 and the cruise demand force u2 is selected as the temporary demand force u in the first arbitration.

However, subsequent to the timing t5, since the operating mode is switched to the cruise prioritized mode, the temporary demand force u, which is not filtered using the vibration damping filter 24, is selected as the final demand force y as it is. Accordingly, subsequent to the timing t5, the final demand force y is calculated without filtering this selected demand force using the vibration damping filter 24, in either case, in which one of the driver demand force u1 and the cruise demand force u2 is selected as the temporary demand force u in the first arbitration.

In accordance with this second embodiment described above, the driver has a choice to select the cruise prioritized mode, in which the cruise demand force u2 is selected as the final demand force y without being filtered using the vibration damping filter 24. Therefore, the vibration damping control can be executed in conformity to the operating mode selected by the driver.

Summarizing this second embodiment, the controller is adapted to controlling the braking force and driving force of the vehicle, in accordance with the demand force. The controller includes the first demand force arithmetic unit 21, second demand force arithmetic unit 22, first arbitration unit 23, and vibration damping filter 24. The first demand force arithmetic unit 21 is adapted to arithmetically calculating the first demand force u1, which includes the factor inducing vibration in suspended components of the vehicle. The second demand force arithmetic unit 22 is adapted to arithmetically calculating the second demand force u2, which substantially excludes the factor inducing vibration in suspended components of the vehicle. The first arbitration unit 23 is adapted to comparing the first demand force u1 with the second demand force u2, thereby selecting one of the first demand force u1 and second demand force u2. The vibration damping filter 24 is adapted to reducing the factor inducing vibration in suspended components of the vehicle from the waveform of the one of the first demand force u1 and second demand force u2 selected using the first arbitration unit 23, thereby producing the post-filter demand force y1. The second arbitration unit 25 is adapted to comparing the post-filter demand force y1, which is filtered using the vibration damping filter 24, with the one of the first demand force u1 and second demand force u2 selected using the first arbitration unit 23, thereby selecting one of the post-filter demand force y1 and the one of the first demand force u1 and second demand force u2 as the final demand force y.

The second arbitration unit 25 selects the one of the first demand force u1 and second demand force u2, which is selected using the first arbitration unit 23, as the final demand force y as it is, when the operating mode is in the cruise prioritized mode for preferentially selecting the second demand force u2.

Third Embodiment

Figure 10:
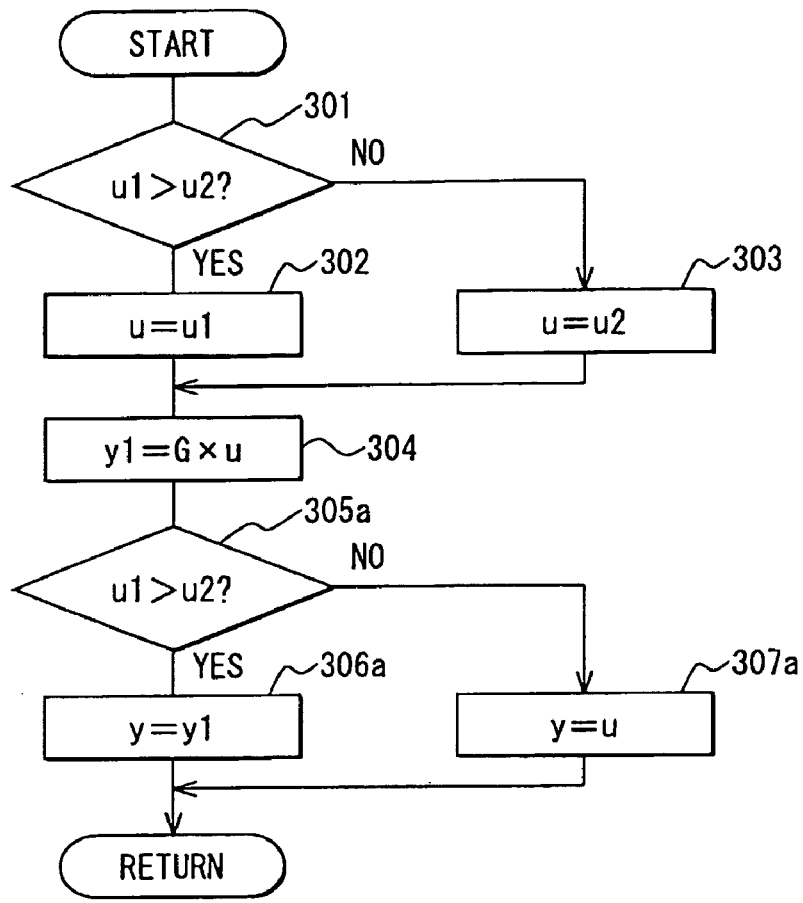
FIG. 10 is a flowchart showing a routine for calculating a demand force, according to a third embodiment of the present invention.

In the above second embodiment, the arbitration system of the second arbitration unit 25 is switched in accordance with the operating mode. However, in this third embodiment, in step 305a of FIG. 10, the second arbitration unit 25 compares the driver demand force u1 with the cruise demand force u2. When the driver demand force u1 is greater than the cruise demand force u2, the routine proceeds to step 306a, in which the second arbitration unit 25 selects the post-filter temporary demand force y1 as the final demand force y. The post-filter temporary demand force y1 is produced by filtering the temporary demand force u, which is selected through the first arbitration unit 23, using the vibration damping filter 24. By contrast, when the driver demand force u1 is equal to or less than the cruise demand force u2 in step 305a, the routine proceed to step 307a, in which the second arbitration unit 25 selects the temporary demand force u, which is selected through the first arbitration unit 23, as the final demand force y as it is. The other operations and structures are substantially the same as those of the above second embodiment.

As follows, one example of the arbitration of the demand force of this third embodiment is described in reference to the time chart shown in FIG. 11.

Figure 11:
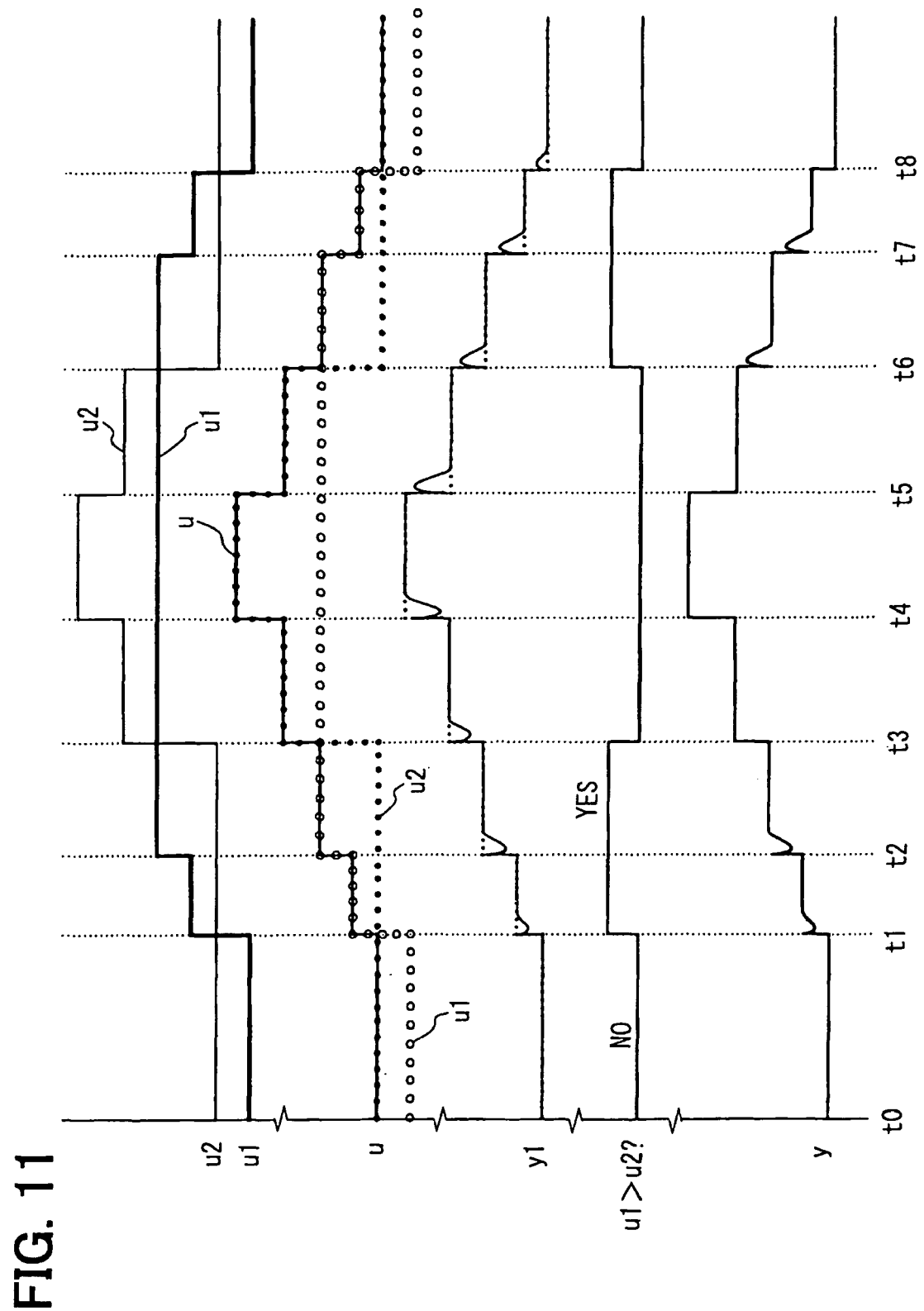
FIG. 11 is a time chart showing an example of an arbitration of the demand force, according to the third embodiment.

In the example of FIG. 11, the driver demand force u1 becomes greater than the cruise demand force u2 in the period between t1 and t3 and the period between t6 and t8. In the periods excluding these period between t1 and t3 and period between t6 and t8, the driver demand force u1 becomes equal to or less than the cruise demand force u2.

In the period between t1 and t3 and period between t6 and t8, in which the driver demand force u1 is greater than the cruise demand force u2, the driver demand force u1 is selected as the temporary demand force u in the first arbitration. In the second arbitration, the post-filter temporary demand force y1 calculated by filtering this temporary demand force u using the vibration damping filter 24 becomes the final demand force y. In this case, the temporary demand force u is equal to the driver demand force u1.

By contrast, in the period between t0 and t1, the period between t3 and t6, and the period subsequent to the timing t8, the driver demand force u1 becomes equal to or less than the cruise demand force u2. In these periods, the cruise demand force u2 is selected as the temporary demand force u in the first arbitration. In the second arbitration, this temporary demand force u, which is equal to the cruise demand force u2, becomes the final demand force y as it is. In this case, the temporary demand force u is not filtered using the vibration damping filter 24. In accordance with such a construction, the vibration damping filter 24 need not be applied to the cruise demand force u2 excluding a factor inducing vibration in suspended components of the vehicle.

Summarizing this third embodiment, the second arbitration unit 25 selects the post-filter demand force y1, which is filtered using the vibration damping filter 24, as the final demand force y, when the first arbitration unit 23 selects the first demand force u1. The second arbitration unit 25 selects the second demand force u2 as the final demand force y as it is, when the first arbitration unit 23 selects the second demand force u2.

Fourth Embodiment

In the above third embodiment, the second arbitration unit 25 immediately sets the cruise demand force u2, which is equal to the temporary demand force u, at the final demand force y in the period, in which the cruise demand force u2 becomes greater than the driver demand force u1. That is, the second arbitration unit 25 immediately sets the cruise demand force u2 at the final demand force y in the period, in which the temporary demand force u is switched from the driver demand force u1 to the cruise demand force u2 in the first arbitration.

Figure 12:
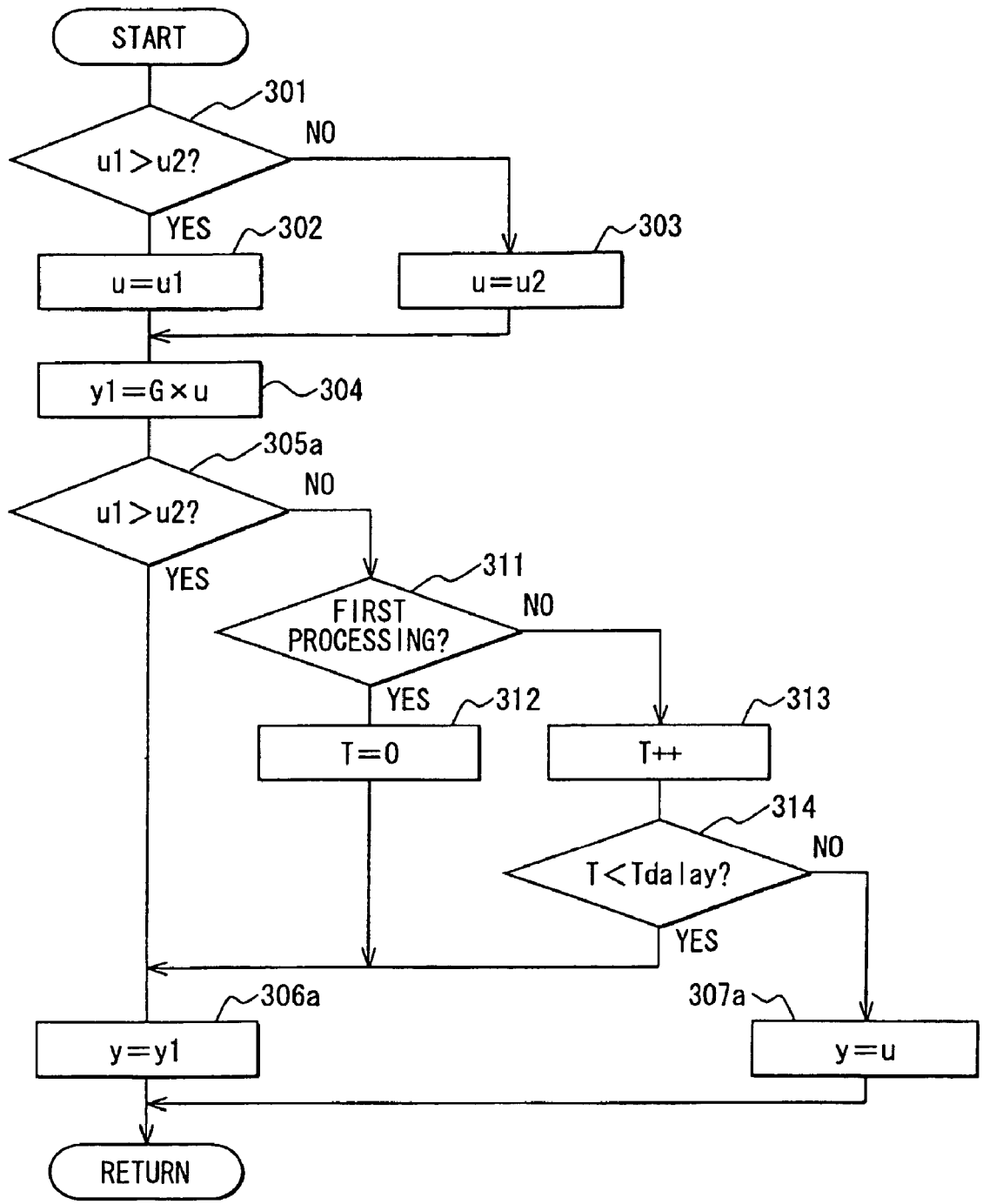
FIG. 12 is a flowchart showing a routine for calculating a demand force, according to a fourth embodiment of the present invention.
Figure 13:
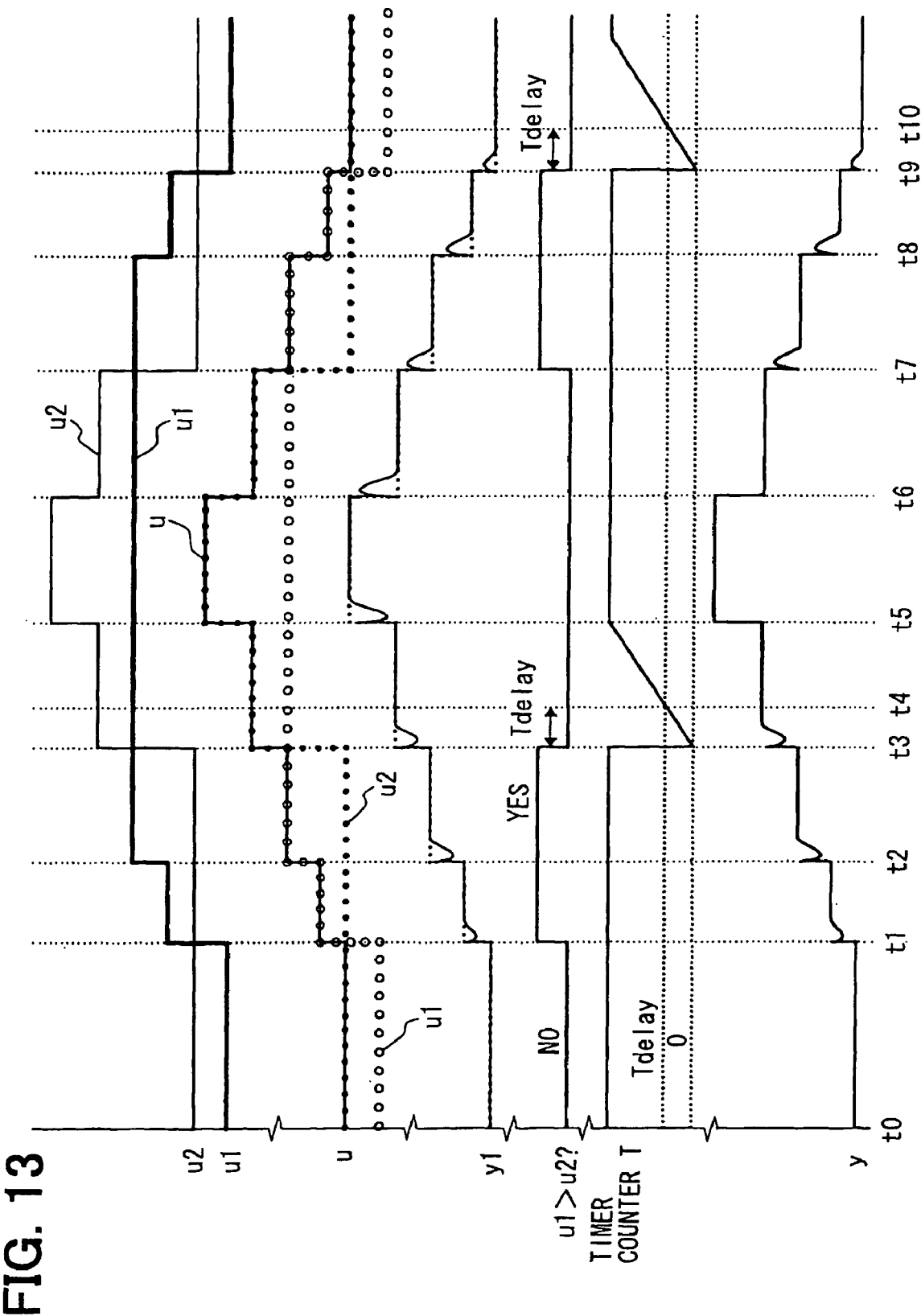
FIG. 13 is a time chart showing an example of an arbitration of the demand force, according to the fourth embodiment.

However, in the fourth embodiment shown in FIGS. 12, 13, the second arbitration unit 25 maintains a state, in which the post-filter temporary demand force y1 calculated by filtering the temporary demand force u, which is equal to the cruise demand force u2, using the vibration damping filter 24 is selected as the final demand force y for a period. This period starts from a time point, in which the cruise demand force u2 becomes greater than the driver demand force u1, and ends at a time point, in which a predetermined time Tdelay elapses. That is, this period starts from the time point, in which the temporary demand force u is switched from the driver demand force u1, and ends at the cruise demand force u2 in the first arbitration. After elapsing the predetermined time Tdelay, it is switched to a state in which the cruise demand force u2, which is equal to the temporary demand force u, is selected as the final demand force y. The other operations and structures are substantially the same as the above third embodiment.

In this fourth embodiment, the final demand force y is arithmetically calculated as follows by executing the demand force arithmetic routine in FIG. 12 at a predetermined interval during the engine operation. First, the first arbitration, in steps 301 to 303, and the filtering of the temporary demand force u using the vibration damping filter 24, in step 304, are performed similarly to the above second embodiment. Thereafter, the routine proceeds to step 305a, in which the driver demand force u1 is compared with the cruise demand force u2. When the driver demand force u1 is greater than the cruise demand force u2, the routine proceeds to step 306a. In step 306a, the post-filter temporary demand force y1 produced by filtering the temporary demand force u is selected as the final demand force y. The post-filter temporary demand force y1 is produced by filtering the temporary demand force u, which is selected through the first arbitration unit 23, using the vibration damping filter 24.

By contrast, when the driver demand force u1 is equal to or less than the cruise demand force u2 in step 305a, the routine proceeds to step 311, in which it is evaluated whether the first processing immediately after the driver demand force u1 becomes equal to or less than the cruise demand force u2. When it is the first processing, the routine proceeds to step 312, in which a timer counter T is reset at 0, so that the routine proceeds to step 306a. The post-filter temporary demand force y1 is maintained being selected as the final demand force y in step 306a. The post-filter temporary demand force y1 is calculated by filtering the temporary demand force u, which is equal to the cruise demand force u2, using the vibration damping filter 24.

Thereafter, when a negative determination is made in step 311, the routine proceeds to step 313. The timer counter T is counted up in step 313, so that the routine proceeds to step 314, in which it is evaluated whether the count value of the timer counter T is less than a predetermined time Tdelay. When the count value is less than the predetermined time Tdelay, the routine proceeds to step 306a. In step 306a, the post-filter temporary demand force y1 is maintained being selected as the final demand force y. The post-filter temporary demand force y1 is calculated by filtering the temporary demand force u, which is equal to the cruise demand force u2, using the vibration damping filter 24.

Thereafter, a negative determination is made in step 314 at a time point, in which the count value of the timer counter T becomes equal to or greater than the predetermined time Tdelay. In this case, the routine proceeds to step 307a, in which the temporary demand force u is selected as the final demand force y. The temporary demand force u is equal to the cruise demand force u2, and is not filtered using the vibration damping filter 24.

As follows, one example of the arbitration of the demand force of this fourth embodiment is described in reference to the time chart shown in FIG. 13.

In the example of FIG. 13, the driver demand force u1 becomes greater than the cruise demand force u2 in the period between t1 and t3 and the period between t7 and t9. In the periods excluding these period between t1 and t3 and period between t7 and t9, the driver demand force u1 becomes equal to or less than the cruise demand force u2.

The arbitration of the demand force in this fourth embodiment differs from that of the above third embodiment in only processings in the period between t3 and t4 and the period between t9 and t10. On the time points t3, t9, a switching is performed to select the cruise demand force u2 in a condition where the driver demand force u1 is selected, in the first arbitration. Simultaneously, a switching is performed not to select the driver demand force u1 in a condition where the select the driver demand force u1 is selected, in the first arbitration. That is, the cruise demand force u2 is switched from non-selection to selection. More specifically, the cruise demand force u2 is selected in a condition where the driver demand force u1 is selected, so that the cruise demand force u2 is selected instead of the driver demand force u1, in the first arbitration. The time points t4, t10 are timings after elapsing the predetermined time Tdelay from the time points t3, t9. In the periods excluding these period between t3 and t4 and period between t9 and t10, substantially the same processings as the above third embodiment are performed.

In the period between t3 and t4 and the period between t9 and t10 from the time point for switching the driver demand force u1 in the first arbitration to elapsing the predetermined time Tdelay, the post-filter temporary demand force y1 is selected as the final demand force y. The post-filter temporary demand force y1 is calculated by filtering the temporary demand force u, which is equal to the cruise demand force u2, using the vibration damping filter 24. After elapsing the predetermined time Tdelay, it is switched to a state in which the cruise demand force u2, which is equal to the temporary demand force u, is selected as the final demand force y. In this a construction, it is possible to restrict the vibration of the vehicle generated immediately after the temporary demand force u is switched from the driver demand force u1 to the cruise demand force u2 in the first arbitration.

Summarizing this fourth embodiment, the second arbitration unit 25 selects the post-filter demand force y1, which is filtered using the vibration damping filter 24, as the final demand force y during the period between a first timing and a second timing. The first timing is when the first arbitration unit 23 selects the second demand force u2 in the condition where the first arbitration unit 23 selects the first demand force u1. The second timing is when the predetermined time Tdelay elapses from this first timing.

Fifth Embodiment

In general, vibration of the vehicle may be easily generated immediately after the driver demand force u1 is switched from the selection to the non-selection by a change of the driver demand force u1. Accordingly, in the fifth embodiment shown in FIGS. 14 to 16, when the driver demand force u1 is switched from the selection to the non-selection in the first arbitration and this switching is determined to be due to the change in the driver demand force u1, the second arbitration unit 25 maintains the post-filter temporary demand force y1 being selected as the final demand force y, during the period from this switching to elapsing the predetermined time Tdelay. The post-filter temporary demand force y1 is calculated by filtering the temporary demand force u, which is equal to the cruise demand force u2, using the vibration damping filter 24. However, when it is determined that the switching is due to the change in the cruise demand force u2, the second arbitration unit 25 immediately selects the cruise demand force u2, which is equal to the temporary demand force u, as the final demand force y.

Figure 15:
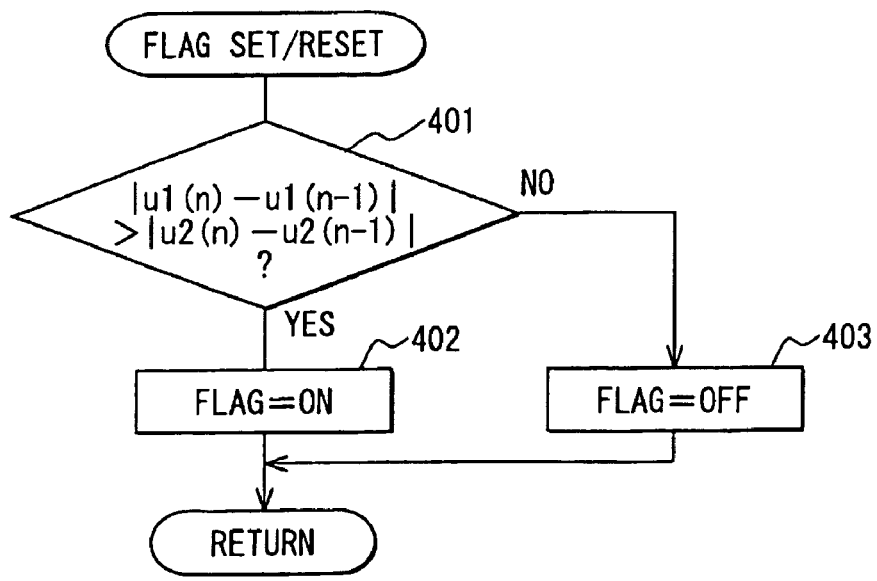
FIG. 15 is a flowchart showing a routine for setting and resetting a flag, according to the fifth embodiment.
Figure 14:
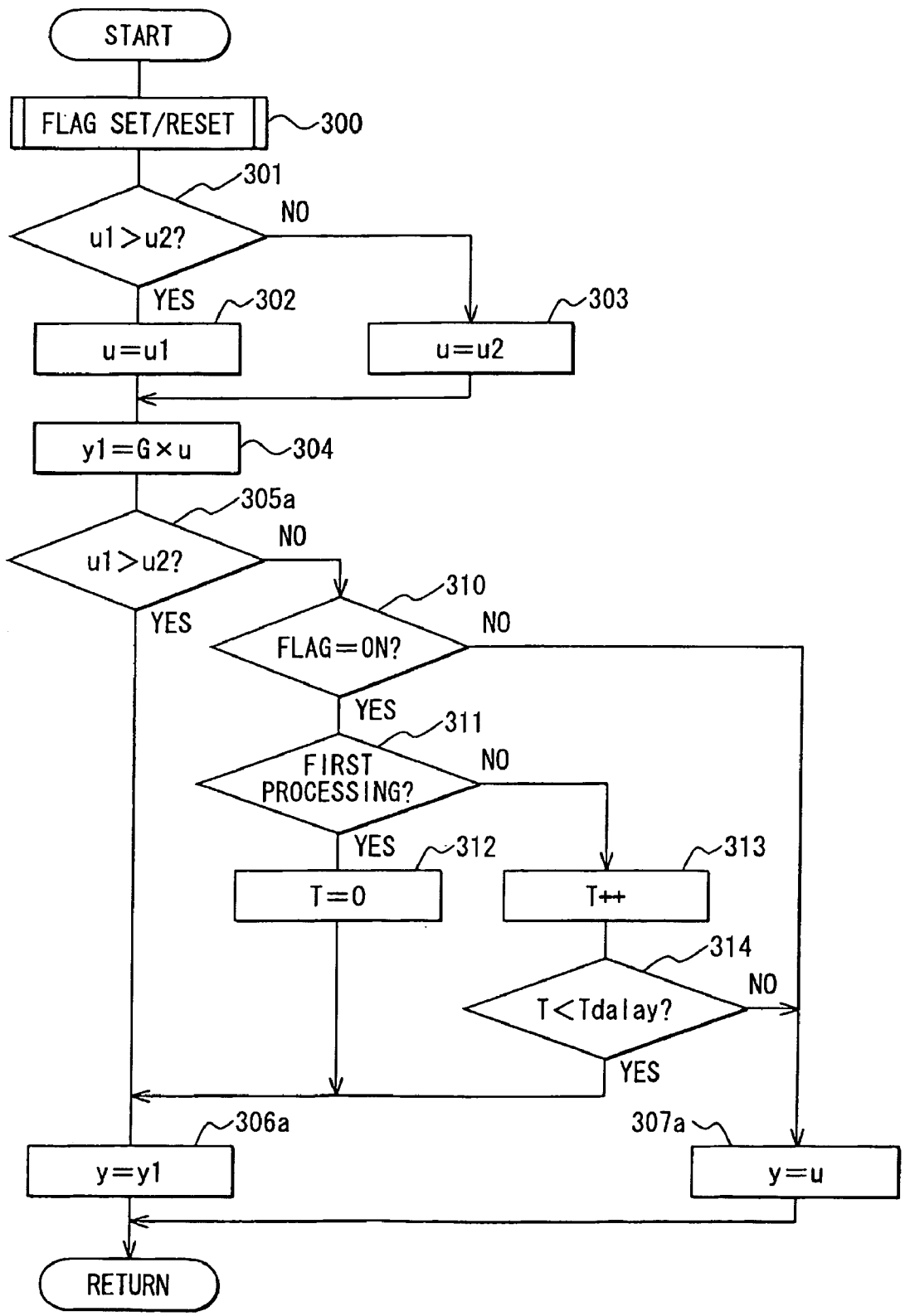
FIG. 14 is a flowchart showing a routine for calculating a demand force, according to a fifth embodiment of the present invention.

The demand force arithmetic routine in FIG. 14 executed in this fifth embodiment differs from the demand force arithmetic routine in FIG. 12 of the above fourth embodiment in only the processings of steps 300 and 310, in general. In the demand force arithmetic routine of FIG. 14, a flag set/reset routine in FIG. 15 is executed in step 300, so that a state evaluating flag is set and reset, as follows. First, in step 401, an absolute value $|u1(n)-u1(n-1)|$ of this variation in the driver demand force u1 per arithmetic interval is compared with an absolute value $|u2(n)-u2(n-1)|$ of this variation in the cruise demand force u2 per arithmetic interval. When it is determined that the absolute value $|u1(n)-u1(n-1)|$ of this variation in the driver demand force u1 is greater than the absolute value $|u2(n)-u2(n-1)|$ of this variation in the cruise demand force u2, the routine proceeds to step 402, in which the state evaluating flag is turned ON. By contrast, when it is determined that the absolute value |u1(n)−u1(n−1)| of this variation in the driver demand force u1 is equal to or less than the absolute value |u2(n)−u2(n−1)| of this variation in the cruise demand force u2, the routine proceeds to step 403, in which the state evaluating flag is turned OFF.

Thereafter, subsequent to the first arbitration in steps 301 to 303 and the filtering in step 304 of the temporary demand force u using the vibration damping filter 24 are performed by a method similar to that of the above second embodiment, the routine proceeds to step 305a. In step 305a, the driver demand force u1 is compared with the cruise demand force u2. When the driver demand force u1 is greater than the cruise demand force u2, the routine proceeds to step 306a, in which the post-filter temporary demand force y1 is selected as the final demand force y. The post-filter temporary demand force y1 is produced by filtering the temporary demand force u, which is selected through the first arbitration unit 23, using the vibration damping filter 24.

By contrast, when the driver demand force u1 is equal to or less than the cruise demand force u2 in step 305a, the routine proceeds to step 310. In step 310, it is evaluated whether the state evaluating flag is turned ON. That is, it is evaluated whether the variation in the driver demand force u1 is greater than the variation in the cruise demand force u2. When it is determined that the state evaluating flag is not turned ON in step 310, the routine proceeds to step 307a, in which it is switched to a state, in which the temporary demand force u is selected as the final demand force y. The temporary demand force u is not filtered using the vibration damping filter 24, and is equal to the cruise demand force u2.

By contrast, when it is evaluated in the above step 310 that the state evaluating flag is turned ON, the routine proceeds to step 311. In step 311, it is evaluated whether it is the first processing immediately after the driver demand force u1 becomes equal to or less than the cruise demand force u2. When it is determined to be the first processing, the routine proceeds to step 312, in which the timer counter T is reset at 0. The routine proceeds to step 306a, in which a state for selecting the post-filter temporary demand force y1 as the final demand force y is continued. The post-filter temporary demand force y1 is calculated by filtering the temporary demand force u, which is equal to the cruise demand force u2, using the vibration damping filter 24.

When a negative determination is made in step 311, the routine proceeds to step 313. The timer counter T is counted up in step 313, and the routine proceeds to step 314, in which it is evaluated whether the count value of the timer counter T is equal to or less than a predetermined time Tdelay. When the count value of the timer counter T is less than the predetermined time Tdelay, the routine proceeds to step 306a, in which the state for selecting the post-filter temporary demand force y1 as the final demand force y is continued. The post-filter temporary demand force y1 is calculated by filtering the temporary demand force u, which is equal to the cruise demand force u2, using the vibration damping filter 24.

A negative determination is made in step 314 at a time point, in which the count value of the timer counter T becomes equal to or greater than the predetermined time Tdelay. In this condition, the routine proceeds to step 307a, in which it is switched to a state for setting the temporary demand force u at the final demand force y. The temporary demand force u is not filtered using the vibration damping filter 24, and is equal to the cruise demand force u2.

As follows, one example of the arbitration of the demand force of this fourth embodiment is described in reference to the time chart shown in FIG. 16.

In the example of FIG. 16, the driver demand force u1 becomes greater than the cruise demand force u2 in the period between t1 and t3 and the period between t7 and t9. In the periods excluding these period between t1 and t3 and the period between t7 and t9, the driver demand force u1 becomes equal to or less than the cruise demand force u2. Accordingly, the driver demand force u1 is switched from the selection to the non-selection in the first arbitration in two timings t3 and t9, similarly to the above fourth embodiment.

In the above fourth embodiment, the post-filter temporary demand force y1 is selected as the final demand force y in the period between t3 and t4 and the period between t9 and t10, until the predetermined time Tdelay elapses from the time point, at which the driver demand force u1 is switched from the selection to the non-selection in the first arbitration. The post-filter temporary demand force y1 is calculated by filtering the temporary demand force u, which is equal to the cruise demand force u2, using the vibration damping filter 24. However, in this fifth embodiment, at the time points t3 and t9, in which the driver demand force u1 is switched from the selection to the non-selection in the first arbitration, it is evaluated whether this switching is caused by a variation in the driver demand force u1 or a variation in the cruise demand force u2.

In the example of FIG. 16, it is determined that the switching is caused by the variation in the cruise demand force u2 at the previous switching time point t3. In this case, differing from the above fourth embodiment, the cruise demand force u2, which is equal to the temporary demand force u, is immediately selected as the final demand force y without waiting elapsing the predetermined time Tdelay at the switching time point t3. Thus, responsibility of the cruise control can be enhanced.

By contrast, at the latter switching time point t9, it is determined that the switching is caused by the variation in the driver demand force u1. In this case, the post-filter temporary demand force y1 is selected as the final demand force y in the period between t9 and t10 from the switching time point t9 to elapsing the predetermined time Tdelay, similarly to the above fourth embodiment. The post-filter temporary demand force y1 is calculated by filtering the temporary demand force u, which is equal to the cruise demand force u2, using the vibration damping filter 24. After elapsing the predetermined time Tdelay, it is switched to a state for selecting the cruise demand force u2, which is equal to the temporary demand force u, as the final demand force y. In accordance with such a construction, it is possible to restrict the vibration generated in the vehicle immediately after the driver demand force u1 is switched from the selection to the non-selection in the first arbitration by the variation in the driver demand force u1.

Summarizing this fifth embodiment, the second arbitration unit 25 selects the post-filter demand force y1, which is filtered using the vibration damping filter 24, as the final demand force y during the period between a first timing and a second timing. The first timing is when the first arbitration unit 23 determines to select the second demand force u2 in the condition where the first arbitration unit 23 selects the first demand force u1, because of the variation in the first demand force u1. The second timing is when the predetermined time Tdelay elapses from this first timing.

Sixth Embodiment

In the above fourth embodiment shown in FIG. 13, the state for selecting the post-filter temporary demand force y1 as the final demand force y is continued in the period until the predetermined time Tdelay elapses from the time points t3 and t9, at which the cruise demand force u2 becomes greater than the driver demand force u1. The post-filter temporary demand force y1 is calculated by filtering the temporary demand force u, which is equal to the cruise demand force u2, using the vibration damping filter 24.

After elapsing the predetermined time Tdelay, it is switched to the state for setting the cruise demand force u2, which is equal to the temporary demand force u, to the final demand force y. However, in the sixth embodiment shown in FIGS. 17, 18, the state for selecting the post-filter temporary demand force y1 as the final demand force y is continued at least partially in the period between t3 and t4 and period between t9 and t10. More specifically, this state for selecting the post-filter temporary demand force y1 as the final demand force y is continued from time points t3 and t9, at which the cruise demand force u2 becomes greater than the driver demand force u1, until an absolute value |y1−u| of the deviation of the demand force becomes to be equal to or less than a predetermined value d. This absolute value |y1−u| of the deviation of the demand force is the deviation between the demand force before the filtering in the vibration damping filter 24 and the demand force after the filtering in the vibration damping filter 24. The post-filter temporary demand force y1 is calculated by filtering the temporary demand force u, which is equal to the cruise demand force u2, using the vibration damping filter 24.

It is switched to a state, in which the cruise demand force u2, which is equal to the temporary demand force u, is selected as the final demand force y at the time points t4 and t10, at which the absolute value |y1−u| of the deviation of the demand force becomes equal to or less than the predetermined value δ.

Figure 17:
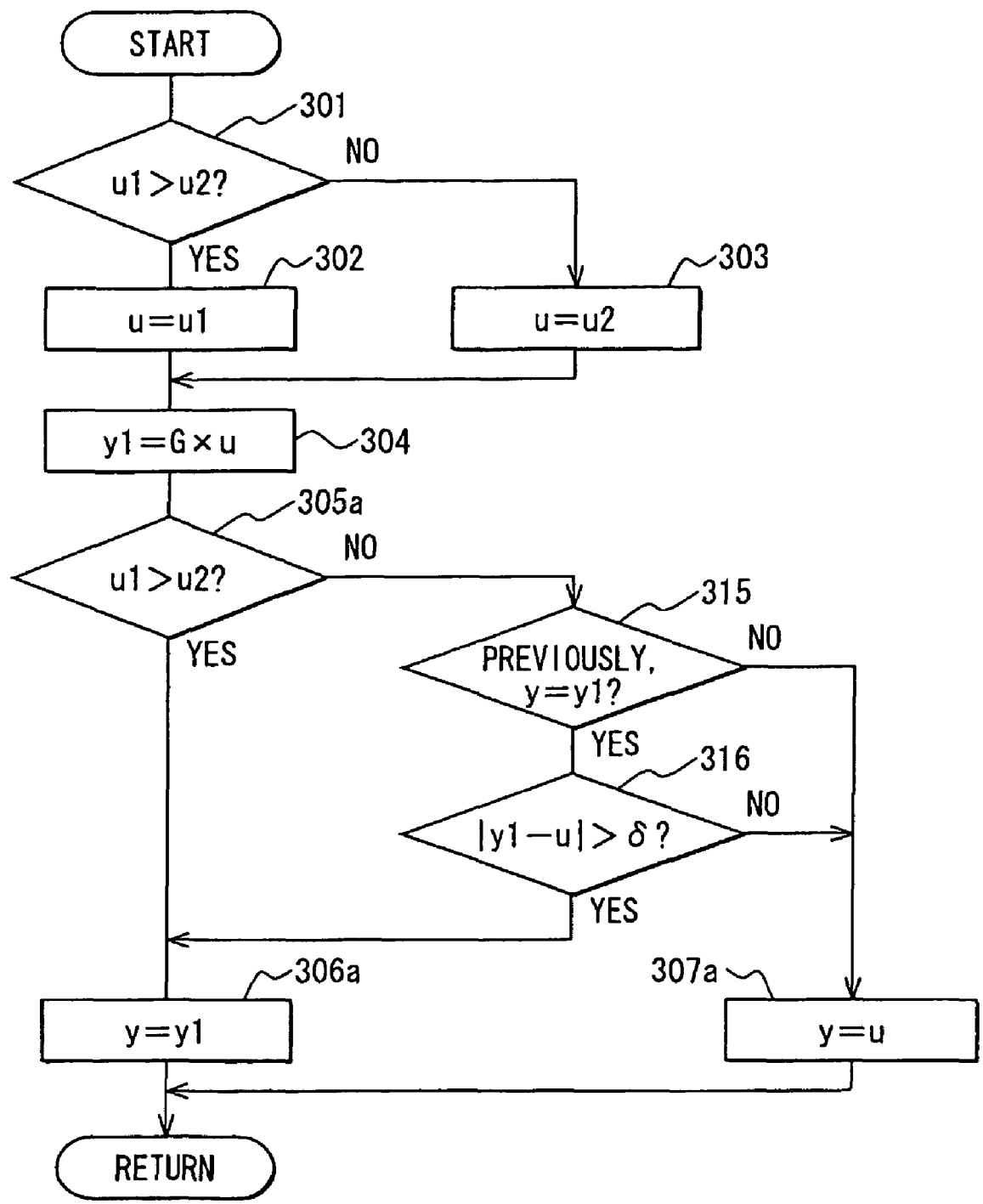
FIG. 17 is a flowchart showing a routine for calculating a demand force, according to a sixth embodiment of the present invention.

In this sixth embodiment, the final demand force y is arithmetically calculated as follows by executing the demand force arithmetic routine in FIG. 17 at a predetermined interval during the engine operation. First, the first arbitration in steps 301 to 303 and the filtering in step 304 of the temporary demand force u using the vibration damping filter 24 are performed by a method similar to that of the above second embodiment. Thereafter, the routine proceeds to step 305*a*, in which the driver demand force u1 is compared with the cruise demand force u2. When the driver demand force u1 is greater than the cruise demand force u2, the routine proceeds to step 306*a*, in which the post-filter temporary demand force y1 is selected as the final demand force y. The post-filter temporary demand force y1 is produced by filtering the temporary demand force u, which is selected through the first arbitration unit 23, using the vibration damping filter 24.

By contrast, when the driver demand force u1 is equal to or less than the cruise demand force u2 in step 305*a*, the routine proceeds to step 315, in which it is evaluated whether the post-filter temporary demand force y1 is selected as the final demand force y in the previous processing. When the post-filter temporary demand force y1 is not previously selected in step 315, the routine proceeds to step 307*a*, in which the temporary demand force u is selected as the final demand force y. The temporary demand force u is not filtered using the vibration damping filter 24, and is equal to the cruise demand force u2.

On the other hand, in step 315, when the post-filter temporary demand force y1 is selected as the final demand force y in the previous processing, the routine proceeds to step 316. In step 316, it is evaluated whether the absolute value |y1−u| of the deviation between the demand force before the filtering in the vibration damping filter 24 and the demand force after the filtering is greater than the predetermined value δ. When the absolute value |y1−u| is greater than the predetermined value δ in step 316, the routine proceeds to step 306*a*, in which the post-filter temporary demand force y1 is selected as the final demand force y. The post-filter temporary demand force y1 is produced by filtering the temporary demand force u, which is selected through the first arbitration unit 23, using the vibration damping filter 24.

A negative determination is made in step 316 when the absolute value |y1−u| of the deviation of the demand force before and after the filtering becomes equal to or less than the predetermined value δ. In this case, the routine proceeds to step 307*a*, in which the temporary demand force u is selected as the final demand force y. The temporary demand force u is not filtered using the vibration damping filter 24, and is equal to the cruise demand force u2.

As follows, one example of the arbitration of the demand force of this sixth embodiment is described in reference to the time chart shown in FIG. 18.

Figure 18:
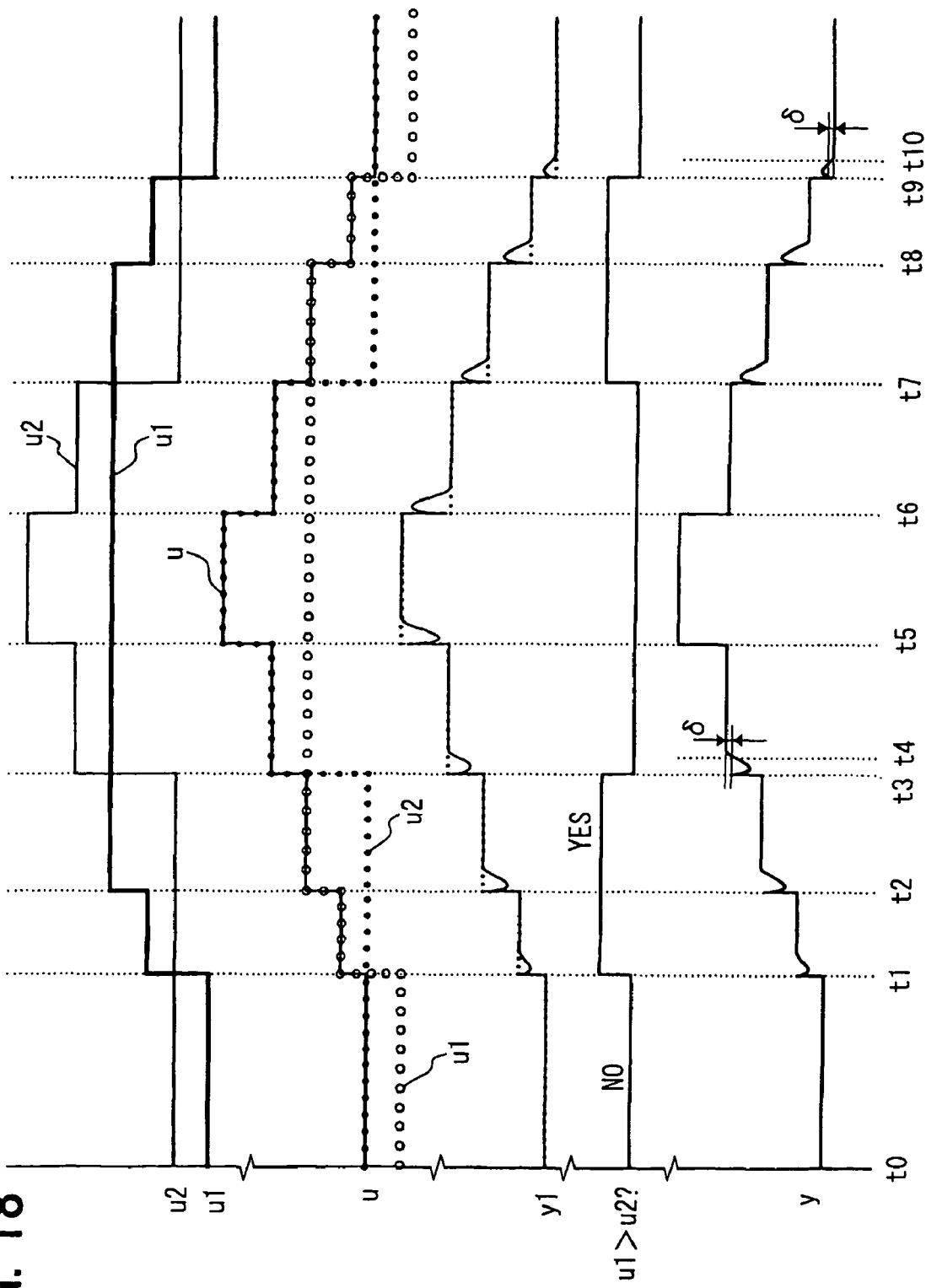
FIG. 18 is a time chart showing an example of an arbitration of the demand force, according to the sixth embodiment.

In the example of FIG. 18, the driver demand force u1 becomes greater than the cruise demand force u2 in the period between t1 and t3 and period between t7 and t9. In the periods excluding these period between t1 and t3 and period between t7 and t9, the driver demand force u1 becomes equal to or less than the cruise demand force u2. Accordingly, similarly to the above fourth embodiment, the driver demand force u1 is switched from the selection to the non-selection in the first arbitration at the two timings t3 and t9. A state for selecting the post-filter temporary demand force y1 as the final demand force y is continued in the period between t3 and t4 and the period between t9 and t10, until the absolute value |y1−u| of the deviation of the demand force becomes equal to or less than the predetermined value from the timings t3 and t9 of this switching. The post-filter temporary demand force y1 is calculated by filtering the temporary demand force u, which is equal to the cruise demand force u2, using the vibration damping filter 24.

It is switched to a state, in which the cruise demand force u2, which is equal to the temporary demand force u, is selected as the final demand force y at time points t4 and t10, at which the absolute value |y1−u| of the deviation of the demand force becomes equal to or less than the predetermined value δ.

In this sixth embodiment described above, it is also possible to restrict the vibration generated in the vehicle immediately after the temporary demand force u is switched from the driver demand force u1 to the cruise demand force u2 in the first arbitration.

Summarizing this sixth embodiment, the second arbitration unit 25 calculates an absolute value of the deviation between the one of the first demand force u1 and second demand force u2, which is selected using the first arbitration unit 23, and the post-filter demand force y1, which is filtered using the vibration damping filter 24. The second arbitration unit 25 selects the post-filter demand force y1, which is filtered using the vibration damping filter 24, as the final demand force y, during the period between the first timing and the second timing. The first timing is when the first arbitration unit 23 selects the one of the first demand force u1 and the second demand force u2 in the condition where the first arbitration unit 23 selects another of the first demand force u1 and the second demand force u2. The second timing is when the absolute value of the deviation becomes equal to of less than the threshold δ.

The present invention is not limited to each of the above embodiments, but can be also applied and executed in an electric automobile in which an electric motor is set at a driving source, and a hybrid vehicle in which both an electric motor and an engine are set to a driving source.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

The invention claimed is:

1. A controller for controlling braking force and driving force of a vehicle, in accordance with demand force, the controller comprising:
a first demand force arithmetic unit for arithmetically calculating first demand force, which includes a factor inducing vibration in suspended components of the vehicle;
a second demand force arithmetic unit for arithmetically calculating second demand force, which substantially excludes the factor inducing vibration in suspended components of the vehicle;
a vibration damping filter for reducing the factor inducing vibration in suspended components of the vehicle from a waveform of the first demand force, thereby producing post-filter demand force; and
an arbitration unit for comparing the post-filter demand force, which is filtered using the vibration damping filter, with the second demand force, thereby selecting one of the post-filter demand force and second demand force as a final demand force.

2. A controller for controlling braking force and driving force of a vehicle, in accordance with demand force, the controller comprising:
a first demand force arithmetic unit for arithmetically calculating first demand force, which includes a factor inducing vibration in suspended components of the vehicle;
a second demand force arithmetic unit for arithmetically calculating second demand force, which substantially excludes the factor inducing vibration in suspended components of the vehicle;
a first arbitration unit for comparing the first demand force with the second demand force, thereby selecting one of the first demand force and second demand force;
a vibration damping filter for reducing the factor inducing vibration in suspended components of the vehicle from a waveform of the one of the first demand force and second demand force selected using the first arbitration unit, thereby producing post-filter demand force; and
a second arbitration unit for comparing the post-filter demand force, which is filtered using the vibration damping filter, with the second demand force when selected using the first arbitration unit, thereby selecting one of the post-filter demand force and the second demand force as a final demand force,
wherein the second arbitration unit selects the post-filter demand force which is filtered using the arbitration damping filter, as the final demand force, when the first arbitration unit selects the first demand force; and
the second arbitration unit selects the second demand force as the final demand force without using said filter, when the first arbitration unit selects the second demand force.

3. The controller according to claim 2, wherein the second arbitration unit selects the one of the first demand force and second demand force, which is selected using the first arbitration unit, as the final demand force as it is, when an operating mode is in a cruise prioritized mode for preferentially selecting the second demand force.

4. The controller according to claim 2,
wherein the second arbitration unit selects the post-filter demand force, which is filtered using the vibration damping filter, as the final demand force during a period between a first timing and a second timing,
the first timing is when the first arbitration unit selects the second demand force in a condition where the first arbitration unit selects the first demand force, and
the second timing is when a predetermined time elapses from the first timing.

5. The controller according to claim 2,
wherein the second arbitration unit selects the post-filter demand force, which is filtered using the vibration damping filter, as the final demand force during a period between a first timing and a second timing,
the first timing is when the first arbitration unit determines to select the second demand force in a condition where the first arbitration unit selects the first demand force, because of a variation in the first demand force, and
the second timing is when a predetermined time elapses from the first timing.

6. The controller according to claim 2,
wherein the second arbitration unit calculates an absolute value of a deviation between the one of the first demand force and second demand force, which is selected using the first arbitration unit, and the post-filter demand force, which is filtered using the vibration damping filter,
the second arbitration unit selects the post-filter demand force, which is filtered using the vibration damping filter, as the final demand force, during a period between a first timing and a second timing,
the first timing is when the first arbitration unit selects the one of the first demand force and the second demand force in a condition where the first arbitration unit selects an other of the first demand force and the second demand force, and
the second timing is when the absolute value of the deviation becomes equal to of less than a threshold.

7. A method for controlling braking force and driving force of a vehicle in accordance with demand force, the method comprising:
firstly calculating first demand force, which includes a factor inducing vibration in suspended components of the vehicle;
secondly calculating second demand force, which substantially excludes a factor inducing vibration in suspended components of the vehicle;
reducing the factor inducing vibration in suspended components of the vehicle from a waveform of the first demand force, thereby producing post-filter demand force; and
comparing the post-filter demand force with the second demand force, thereby selecting one of the post-filter demand force and second demand force as final demand force.

8. A method for controlling braking force and driving force of a vehicle, in accordance with demand force, the method comprising:
firstly calculating first demand force, which includes a factor inducing vibration in suspended components of the vehicle;

secondly calculating second demand force, which substantially excludes a factor inducing vibration in suspended components of the vehicle;

firstly comparing the first demand force with the second demand force, thereby selecting one of the first demand force and second demand force;

reducing the factor inducing vibration in suspended components of the vehicle from a waveform of the first demand force, thereby producing post-filter demand force; and secondly comparing the post-filter demand force with the second demand force, thereby selecting one of the post-filter demand force and the second demand force, as a final demand force, wherein the post-filter demand force is selected as the final demand force in the step of secondly comparing, when the first demand force is selected in the step of firstly comparing; and the second demand force is selected as the final demand force as it is in the step of secondly comparing, when the second demand force is selected in the step of firstly comparing.

9. The method according to claim 8, further comprising:
setting an operating mode at a cruise prioritized mode for preferentially selecting the second demand force,
wherein the one of the first demand force and second demand force is selected as the final demand force as it is in the step of secondly comparing, in the cruise prioritized mode.

10. The method according to claim 8,
wherein the post-filter demand force is selected as the final demand force in the step of secondly comparing, during a period between a first timing and a second timing,
the first timing is when the second demand force is selected in a condition where the first demand force is selected in the step of firstly comparing, and
the second timing is when a predetermined time elapses from the first timing.

11. The method according to claim 8,
wherein the post-filter demand force is selected as the final demand force in the step of secondly comparing, during a period between a first timing and a second timing,
the first timing is when the second demand force is selected in a condition where the first arbitration unit selects the first demand force, because of a variation in the first demand force in the step of firstly comparing, and
the second timing is when a predetermined time elapses from the first timing.

12. The method according to claim 8, by further comprising:
calculating an absolute value of a deviation between the post-filter demand force and the one of the first demand force and second demand force,
wherein the post-filter demand force is selected as the final demand force in the step of secondly comparing, during a period between a first timing and a second timing,
the first timing is when the one of the first demand force and the second demand force is selected in a condition where an other of the first demand force and the second demand force is selected in the step of firstly comparing, and
the second timing is when the absolute value of the deviation becomes equal to of less than a threshold.

13. The controller according to claim 1, wherein the vibration damping filter is configured not to reduce the factor inducing vibration in suspended components of the vehicle from a waveform of the second demand force.

14. The controller according to claim 13, wherein the vibration damping filter is directly connected with the second demand force arithmetic unit.

15. The method according to claim 7, wherein the factor inducing vibration in suspended components of the vehicle is reduced from a waveform of only the first demand force in the step of reducing.

16. The controller according to claim 15, wherein:
the first demand force is calculate by a first demand force arithmetic unit in the step of firstly calculating, and
the second demand force is calculated by a second demand force arithmetic unit in the step of secondly calculating,
the method further comprising:
directly inputting the calculated first demand force from the first demand force arithmetic unit to a vibration damping filter,
wherein the factor inducing vibration in suspended components of the vehicle is reduced by the vibration damping filter in the step of reducing.

* * * * *

UNITED STATES PATENT AND TRADEMARK OFFICE
CERTIFICATE OF CORRECTION

PATENT NO. : 7,853,387 B2
APPLICATION NO. : 11/629291
DATED : December 14, 2010
INVENTOR(S) : Yasuhiro Nakai et al.

Page 1 of 1

It is certified that error appears in the above-identified patent and that said Letters Patent is hereby corrected as shown below:

On the title page, item (86): change "PCT/JP2006/007295" to "PCT/JP2006/307295".

Signed and Sealed this
Fifteenth Day of March, 2011

David J. Kappos
*Director of the United States Patent and Trademark Office*